US 6,653,057 B1

(12) United States Patent
Koyama

(10) Patent No.: US 6,653,057 B1
(45) Date of Patent: Nov. 25, 2003

(54) STAMPER FOR FORMING OPTICAL DISK SUBSTRATE AND METHOD OF MANUFACTURING THE SAME

(75) Inventor: Osamu Koyama, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 222 days.

(21) Appl. No.: 09/717,237

(22) Filed: Nov. 22, 2000

(30) Foreign Application Priority Data

Nov. 26, 1999 (JP) .......................................... 11-336748
Dec. 21, 1999 (JP) .......................................... 11-362781
Nov. 16, 2000 (JP) .......................................... 2000-349921

(51) Int. Cl.$^7$ ................................................. G02B 4/18
(52) U.S. Cl. ........................ 430/320; 430/321; 430/945; 216/47; 216/57; 101/4
(58) Field of Search ................................. 430/321, 320, 430/945; 101/4; 216/47, 57

(56) References Cited

U.S. PATENT DOCUMENTS

| | | | | |
|---|---|---|---|---|
| 4,057,831 A | * | 11/1977 | Jacobs et al. | 430/321 |
| 4,152,726 A | * | 5/1979 | Kojima et al. | 430/945 |
| 4,619,804 A | * | 10/1986 | Leonard et al. | 430/5 |
| 4,724,043 A | * | 2/1988 | Bergendahl et al. | 430/321 |
| 4,926,056 A | * | 5/1990 | Spindt | 313/230 |
| 5,278,028 A | * | 1/1994 | Hadimioglu et al. | 430/321 |
| 5,965,301 A | * | 10/1999 | Nara et al. | 430/5 |
| 6,027,825 A | | 2/2000 | Shiratori et al. | 428/694 ML |
| 6,177,175 B1 | * | 1/2001 | Hashimoto | 369/13 |
| 6,228,562 B1 | * | 5/2001 | Kawanishi | 430/321 |

FOREIGN PATENT DOCUMENTS

| | | | |
|---|---|---|---|
| EP | 0880130 | * | 11/1988 |
| EP | 0 777 216 A2 | | 6/1997 |
| JP | 59-180801 | * | 10/1984 |
| JP | 63-071957 | * | 4/1988 |
| JP | 03-100942 | * | 4/1991 |
| JP | 06-043311 | * | 2/1994 |
| JP | 6-258510 | | 9/1994 |
| JP | 7-161080 | | 6/1995 |
| JP | 9-161321 | | 6/1997 |
| JP | 9-161631 | | 6/1997 |
| JP | 2000-225619 | * | 8/2000 |

OTHER PUBLICATIONS

Elliott "Integrated Circuit Fabrication Technology" (p 245–291) ©1982.*
T. Shiratori, "Realization of a High–Density Magneto–Optical Disk Through the Use of Domain Wall Displacement Detection," 23(2) *Journal of the Magnetics Society of Japan* 764–769 (1999).
Svelto, O., "Principles of Lasers", pp 200–203 (1989).

* cited by examiner

Primary Examiner—Martin Angebranndt
(74) Attorney, Agent, or Firm—Fitzpatrick, Cella, Harper & Scinto

(57) ABSTRACT

A method of manufacturing a stamper for forming an optical disk substrate by applying a photoresist onto a master substrate, exposing the photoresist to light to produce a pattern, and forming a guiding groove by etching using the remaining photoresist after development as a mask, which comprises the steps of forming in advance a plurality of thin film layers of mutually different materials on the master substrate in a multilayer structure and sequentially etching the plurality of thin film layers selectively to produce the guiding groove.

30 Claims, 15 Drawing Sheets

STAMPER FOR FORMING OPTICAL DISK SUBSTRATE AND METHOD OF MANUFACTURING THE SAME

BACKGROUND OF THE INVENTION

1. Field of the Invention

This invention relates to a stamper for forming a guiding groove of an optical disk substrate (or a magneto-optical recording medium substrate) and also to a method of manufacturing the same. The present invention is particularly useful for forming a land/groove recording optical disk of which both the land section and the groove section can be used for recording.

2. Related Background Art

FIG. 11 of the accompanying drawings schematically illustrates a magneto-optical recording medium prepared by forming films on a land/groove substrate. In FIG. 11, a recording track 8 located remotely as viewed from a light beam 125 incident to the recording medium is referred to as the land section, whereas a recording track 9 located closer as viewed from the light beam 125 is referred to as the groove section. In land/groove recording, the groove section operates as the guiding groove for tracking when the land track is used for signal recording/reproduction, whereas the land section operate as the guiding groove for tracking when the groove track is used for signal recording/reproduction. Thus, this recording medium can effectively be used for improving the recording density in the track direction because both the land section and the groove section that are located side by side can be used simultaneously for recording.

Since the domain wall displacement detection (DWDD) method (U.S. Pat. No. 6,027,825) is useful for improving the recording density along the linear direction, the areal recording density of a magneto-optical recording medium can be dramatically improved by combining this method and the land/groove recording compared with a conventional recording medium.

In the land/groove recording, the use of a so-called deep groove substrate (Japanese Patent Application Laid-Open No. 9-161321) having a sharply tapered land and groove as shown in FIG. 11 is effective for facilitating the domain wall displacement. The tapered section (lateral walls between the land and the groove) are practically free from deposition of magnetic film if the magnetic films are formed by using a highly directional film forming method. Then, it is possible to produce magnetic domains whose lateral walls are practically free from magnetic domain walls for each of the land and groove sections so that the track can be magnetically segmented to facilitate the domain wall displacement. The mechanical distance between the land track 8 and the groove track 9 is preferably between about 100 nm and about 300 nm, which is at least greater than the total film thickness of the magnetic films (80 nm in the embodiment).

Additionally, the lateral walls that are free from deposition of magnetic film are effective for suppressing thermal interference of the adjacent tracks and improving the resistance against the cross erasure of the tracks. Additionally, such lateral walls may give rise to an effect of suppressing cross talks between the adjacent tracks during reproduction operation in the case of domain wall displacement detection method, because it is possible not to heat the neighboring tracks above the domain wall displacement triggering temperature Ts in the reproduction operation. Then, no domain wall displacement occurs in the magnetic domains of the neighboring tracks so that normal magneto-optical reproduction operation proceeds. Significant cross talks do not take place when the length of the recording mark is made smaller than the resolution of a light spot used for the reproduction operation.

Then, due to the synergetic effect of the magnetic segmentation of tracks and the improvement in the resistance against cross erasures and the suppression of cross talks, it is possible to dramatically improve the areal recording density by combining a deep groove substrate and the domain wall displacement detection method (see, inter alia, Shiratori: "Realization of a High Density Magneto-optical Disk by Using the Domain Wall Displacement Detection Method", Bulletin of Japan Applied Magnetism, Vol. 23, No. 2, 1999, pp. 764–769).

Meanwhile, the technique of anisotropic etching is generally used for preparing a deep groove substrate that is required to have a nearly rectangular cross section. For example, Japanese Patent Application Laid-Open No. 7-161080 describes a method of manufacturing and processing a stamper for forming a land/groove substrate by reactive ion etching (RIE).

The known method of manufacturing and processing a stamper for forming a land/groove substrate will be described by referring to FIGS. 13A through 13H and FIGS. 14A and 14B of the accompanying drawings. Firstly, a synthetic quartz master substrate 1 having an outer diameter of 350 mm, an inner diameter of 70 mm and a thickness of 6 mm that has been polished to have a surface roughness of less than 1 nm is thoroughly rinsed (FIG. 13A). (1) Then, a primer and a positive photoresist 2 are sequentially applied to the surface of the synthetic quartz master substrate 1 by spin coating. Subsequently, the master substrate is pre-baked in a clean oven. The resist has a thickness of about 200 nm (FIG. 13B). (2) Thereafter, a predetermined area of the master substrate is exposed to a laser beam emitted from a cutting machine having an Ar ion laser having a wavelength of 458 nm as a light source with a constant track pitch. In FIG. 13C, reference numeral 3 denotes the laser beam emitted from the cutting machine and reference numeral 4 denotes the exposed area, while reference number 5 denotes the unexposed area. The master substrate is continuously exposed to the laser beam typically by selecting the intensity of the laser beam so as to have a track pitch of 1.6 $\mu$m and a land (or groove) width of about 0.8 $\mu$m after the development process. During the exposure, the synthetic quartz master substrate is driven to rotate at a rate of 450 rpm and the laser beam spot has a diameter of 1.3 $\mu$m (FIG. 13C). (3) Thereafter, the exposed areas are removed by spin development, using an inorganic alkali developing solution. Then, the master substrate is washed by means of a pure water shower, spin-dried and post-baked in a clean oven for post processing (FIG. 13D). (4) Thereafter, the master substrate is placed in a chamber of a reactive ion etching system, and after evacuating the chamber to a degree of vacuum of $1\times10^{-4}$ Pa, the master substrate is subjected to a reactive ion etching process by introducing $CHF_3$ gas with a gas flow rate of 6 sccm, a gas pressure of 0.3 Pa, an RF power supply rate of 300 W, a self bias voltage of $-300$V and a gap of 100 mm separating the electrodes. The etching process is conducted until a predetermined groove depth (e.g., 85 nm) is obtained by regulating the etching time (FIG. 13E). (5) Then, the master substrate 7 is immersed in aremover solution prepared by mixing concentrated sulfuric acid and hydrogen peroxide to remove the remaining resist. In FIG. 13F, reference numeral 8 denotes a land section and reference numeral 9 denotes a groove section (FIG. 13F). (6)

After rinsing, the surface of the master substrate 7 is turned electroconductive by forming a Ni film 10 on the surface by sputtering (FIG. 13G). (7) Then, the master substrate 7 is subjected to an electroforming process, using Ni. In FIG. 13H, reference numeral 11 denotes an electroformed Ni layer (FIG. 13H). (8) After polishing the electroformed Ni surface, the electroformed Ni layer 11 is removed from the master substrate 7 (FIG. 14A). (9) Now, a finished stamper 12 is finally produced (FIG. 14B). The same land/groove pattern can be copied to the surfaces of a number of glass substrates typically by means of a photopolymer (2P) method, using the finished stamper.

Japanese Patent Application Laid-Open No. 6-258510 discloses a mold for reproducing a diffraction grating by using a reactive ion etching technique and a method of manufacturing such a mold. FIG. 19 of the accompanying drawings is a schematic perspective view of part of the mold for preparing a diffraction grating according to the above patent document, which mold comprises a quartz-made substrate 201 having a flat surface 201a and first through third double layer films 202a through 202c formed on the surface 201a. Each of the double layer films 202a through 202c is formed by laying a pair of thin films 203, 204 of respective materials that are different from each other. For reproducing a diffraction grating a groove 205 that serves recesses having a bottom surface 205a and a pair of steps 205b, 205c is formed by removing a predetermined portion of the double layer films 202a through 202c. The materials of the two thin films 203, 204 of each of the double layer films 202a through 202c are so selected that one of them is highly reactive to a specific etching gas (e.g., $CF_4$) whereas the other scarcely reacts with it, while the former is scarcely reactive to another etching gas (e.g., $CCl_4$) whereas the latter easily reacts with it. Thus, if the film thicknesses of the two thin films 203, 204 of each of the double layer films 202a through 202c are highly precisely controlled, the bottom surface 205a and the two steps 205b, 205c of the groove 205 can be made to have predetermined respective depths h1 through h3 by using the two etching gases alternately in the etching process. The etching time and other etching parameters do not need to be controlled highly accurately in this etching process and therefore the etching process can be simplified to reduce the cost of manufacturing a mold for reproducing a diffraction grating.

However, the known method of manufacturing a stamper for forming an optical disk substrate is accompanied by the following problems.

To begin with, a first problem will be discussed by referring to FIGS. 15 and 16 of the accompanying drawings. FIG. 15 is an enlarged partial view of the master substrate in the step of FIG. 13E of the reactive ion etching process. If the groove has a depth exceeding 100 nm, reactive ions are reflected by the lateral walls of the groove and condensed at the edges of the groove as shown in FIG. 15 to produce excessively etched areas as shown in FIG. 16. If a substrate is formed by using such stamper by a 2P method or an injection molding method, the groove of the substrate will have corresponding projections along the edges thereof. In the case of a deep groove substrate having a groove depth of about 150 nm, the projections may be as high as several nanometers to remarkably damage the smoothness of the groove. Then, if a domain wall displacement detection method is used, the magnetic domain walls are prevented from moving smoothly by the projections.

Now, a second problem will be discussed by referring to FIGS. 17 and 18 of the accompanying drawings. Generally, it is difficult to control the selective etching ratio of a resist and quartz in a reactive ion etching operation. The above cited Japanese Patent Application Laid-Open No. 7-161080 teaches that the controllability of the selective etching ratio of resist 2 and quartz substrate 1 is improved by appropriately selecting etching gases and using low gas pressure and low RF power. However, with such measures, the selective etching ratio is improved only to several to 1 and the applied resist can retreat as a result of the etching process. In many cases, moreover, the retreat of resist does not occur evenly Ad due to uneven exposure and the unevenness of the material of the resist so that the applied resist shows undulations 14 as shown in FIG. 17. The undulations 14 are maintained throughout the etching process to cause wrinkled surface roughness 15 on the lateral walls. The master substrate 7 also has the surface roughness 15 as shown in FIG. 18 after removing the resist, which surface roughness 15 is then transferred to a stamper to be prepared and then to a substrate prepared by using the stamper. When a substrate having such rough lateral walls is used for magneto-optical recording/reproduction, the spot of light to be used for reproduction operation is dispersed by the rough surfaces of the lateral walls to cause fluctuation of the quantity of the reflected light, which by turn increases substrate noises in the information reproduction signal and degrades the S/N ratio of the signal. Particularly, in the case of using a domain wall displacement detection method, there arises a problem that the rough surface area with wrinkles of about several tens of nanometers that are coused at each shoulder of the land section obstructs smooth movement of magnetic domain walls in addition to the problem of degraded S/N ratio.

A third problem will be discussed below. The method described in the above cited Japanese Patent Application Laid-Open No. 7-161080 comprises an etching process using $CHF_3$ gas so that consequently fluorine resins $[-(CF_2-CF_2)_n-]$ and the like are produced abundantly during the etching process. While such resins cover the surface of the resist applied to the substrate and protects the resist against reactive ions to improve the selective etching ratio if produced at an appropriate rate, they will hardly be removed out of a deep groove to give rise to an unevenly etched surface, adversely affecting the rectangularity of the lateral walls and consequently aggravating the surface roughness of the groove sections, if they are produced excessively. These defects are transferred to the stamper and then to the substrate products reproduced by using the stamper so that, if such a substrate is used for magneto-optical recording/reproduction, the spot of light to be used for reproduction is dispersed by the rough surfaces of the lateral walls to cause fluctuation of the quantity of the reflected light, which by turn increases substrate noises in the information reproduction signal and degrades the S/N ratio of the signal.

Now, a fourth problem will be discussed below. Generally, with reactive ion etching, it is difficult to rigorously control the groove depth, that the bottom surfaces of the grooves have unevenness in terms of the groove depth due to variation in the material of the substrates and fluctuation of the atmosphere in the etching chamber. For example, the groove depth can vary by as much as 7% for the grooves having a depth of about 150 nm when using a $\phi 200$ mm substrate.

Finally, a fifth problem is that the known method of manufacturing a stamper for forming an optical disk substrate requires the use of a homogeneous and costly synthetic quartz substrate.

SUMMARY OF THE INVENTION

In view of the above identified problems of the prior art, it is therefore the object of the present invention to provide a stamper that can be used for manufacturing a high precision and high performance optical disk with a simple way at low cost and a method of manufacturing such stamper.

The inventor of the present invention found that a process of forming a plurality of different thin film layers (that are different from each other in terms of etching ratio) on a master substrate as a multilayer structure or forming a thin film layer of a material different from the material of the master substrate (in terms of etching ratio) on the master substrate and then selectively etching the thin film layer(s) (anisotropic etching) is highly effective for a method of manufacturing a stamper for copying a land/groove recording optical disk. The present invention is based on this finding.

Thus, according to the present invention, there is provided a method of manufacturing a stamper for forming an optical disk substrate by applying a photoresist onto a master substrate, exposing the photoresist to light to produce a pattern, and forming a guiding groove by etching using the remaining photoresist after developement as a mask, the method comprising the steps of forming in advance a plurality of thin film layers of mutually different materials on the master substrate in a multilayer structure and sequentially etching the plurality of thin film layers selectively to produce the guiding groove.

In another aspect of the invention, there is provided a method of manufacturing a stamper for forming an optical disk substrate by applying a photoresist onto a master substrate, exposing the photoresist to light to produce a pattern, and forming a guiding groove by etching using the remaining photoresist after development as a mask, the method comprising the steps of forming in advance at least one thin film layer composed of a material different from the material of the master substrate and anisotropically etching the thin film layer selectively to produce the guiding groove.

In still another aspect of the invention, there is provided a stamper for forming an optical disk substrate manufactured by the manufacturing method according to the invention.

DESCRIPTION OF THE PREFERRED EMBODIMENTS

Figure 1A:
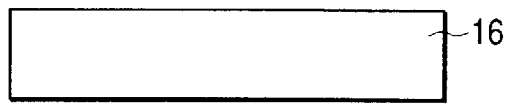
FIGS. 1A, 1B, 1C, 1D, 1E, 1F, 1G and 1H are schematic illustrations of a first embodiment of a method of manufacturing a stamper for forming a land/groove substrate according to the invention, sequentially showing manufacturing steps.

Now, the present invention will be described in greater detail by referring to the accompanying drawings that illustrate preferred embodiments of the invention.

For the manufacturing method of the present invention, when forming a plurality of thin film layers of mutually different materials on a master substrate as a multilayer structure and then etching the plurality of thin film layers, each of the thin film layers is typically subjected to dry etching and wet etching to expose the master substrate in a desired pattern (guiding grooves of a groove profile). Techniques that can be used for dry etching for the purpose of the invention include anisotropic etching such as reactive ion etching (RIE), sputter etching (SE), reactive ion beam etching (RIBE) and sputter ion beam etching (SIBE), of which reactive etching (RIE) can preferably be used for the purpose of the invention. According to the invention, a deep guiding groove preferably having a depth of more than 100 nm, more preferably between about 100 nm and about 300 nm, is formed by such etching technique.

More specifically, a first thin film layer and a second thin film layer are formed in advance on a master substrate by using respective materials that are different from each other. Then, the second thin film layer is selectively subjected to anisotropic etching, using the residual photoresist as a mask, and subsequently the first thin film layer is selectively subjected to wet etching. Materials that can be used for the first thin film layer include those that are less etched by the anisotropic etching than the material of the second thin film layer such as $Al_2O_3$ and $Cr_2O_3$; materials that can be used for the second thin film layer include those that are more easily etched by the anisotropic eching than the material of the first thin film layer such as $SiO_2$. The total thickness of the first thin film layer and the second thin film layer is greater than the magnetic layer formed on the optical disk substrate. The film thickness of the first thin film layer is such that the surface of the substrate is not exposed when the second thin film layer is anisotropically etched. On the other hand, the film thickness of the second thin film layer should be sufficiently greater than that of the first thin film layer because the second thin film layer is used for forming a guiding groove.

A third thin film layer may be formed on the second thin film layer. Then, the third thin film layer is selectively subjected to etching (anisotropic etching or wet etching) using the residual photoresist as a mask, and subsequently the second thin film layer is selectively subjected to anisotropic etching using at least the third thin film layer as a mask, and then the first thin film layer is selectively subjected to wet etching. The film thickness of the third thin film layer is such that the masked part of the second thin film layer is not exposed when the second thin film layer is subjected to anisotropic etching. Specific examples of material that can be used for the third thin film layer include $Al_2O_3$ and $Cr_2O_3$ (or Cr).

The operation of wet etching of the first thin film layer composed of $Al_2O_3$ or $Cr_2O_3$ may use an alkali solution. The operation of dry etching of the second thin film layer composed of $SiO_2$ preferably uses $CHF_3$ gas or a mixture gas of $CF_4$ and $H_2$. Alternatively, a mixture gas of $CHF_3$ and $CF_4$ may be used. The operation of dry etching of the third thin film layer composed of $Al_2O_3$, $Cr_2O_3$ or Cr may use $CCl_4$ gas or the like. When the third thin film layer is subjected to wet etching, an alkali solution may be used if it is composed of $Al_2O_3$ or $Cr_2O_3$, whereas a cerium ammonium nitride solution may be used if it is composed of Cr.

For the purpose of the present invention, methods that can be used for forming the thin film layers include vacuum evaporation, sputtering, ion plating, ion beam assisted evaporation, ionized metal sputtering, ion beam sputtering and other known methods. The thin films are preferably made to have strong adhesion and enhanced strength because they are subjected to reactive ion etching and the like and are exposed to a developing solution and remover solution that may be highly acidic or alkaline. Additionally, the thin films are preferably dense films with a surface roughness comparable to that of the glass-made master substrate.

When a plurality of thin film layers are formed on the master substrate by using mutually different materials, the master substrate is preferably made of glass although a synthetic quartz master substrate may also be used, because the former is less costly than the latter.

On the other hand, when a thin film layer is formed on a master substrate by using a material that is different from that of the master substrate and subjected to anisotropic etching, the master substrate is preferably a single crystal Si substrate and the thin film layer is made of thermally oxidated Si ($SiO_2$) thereof. Then, the thermally oxidated film ($SiO_2$) is subjected to anisotropic etching to expose the master substrate in a desired pattern (guiding grooves of a groove profile).

According to the invention, a photoresist is applied to the thin film layer and exposed to light to produce a pattern, and then the photoresist remaining after the development is used as a mask for forming a guiding groove. For example, the glass-made substrate is exposed to a laser beam spot having a desired diameter, while rotating the glass substrate, to produce tracks arranged with a constant pitch.

For the purpose of the invention, a laser beam is preferably used for the operation of exposing the thin film layer to light to form a pattern. A uniform groove width can be obtained by using a small spot diameter and increasing the amount of exposure. The contour of the laser beam spot [J(r)] can be approximated by the Gaussian distribution using formula (I) below:

$$J(r)=J_0 \exp(-2r^2/w_0^2) \tag{I}$$

where r: distance from the center of the laser beam and $w_0$: spot radius ($1/e^2$ diameter).

If the amount of exposure (irradiated energy density) at which the amount of etching is almost equivalent with respect to the thickness of the resist film is taken as $J_s$, the groove width $2r_s$ when conducting exposure using a laser beam spot having the distribution of quantity of light as expressed by formula (I) above is expressed by formula (II) below.

$$2r_s = \sqrt{2} w_0 \cdot \sqrt{\{\ln(J_0/J_s)\}} \tag{II}$$

Figure 12:
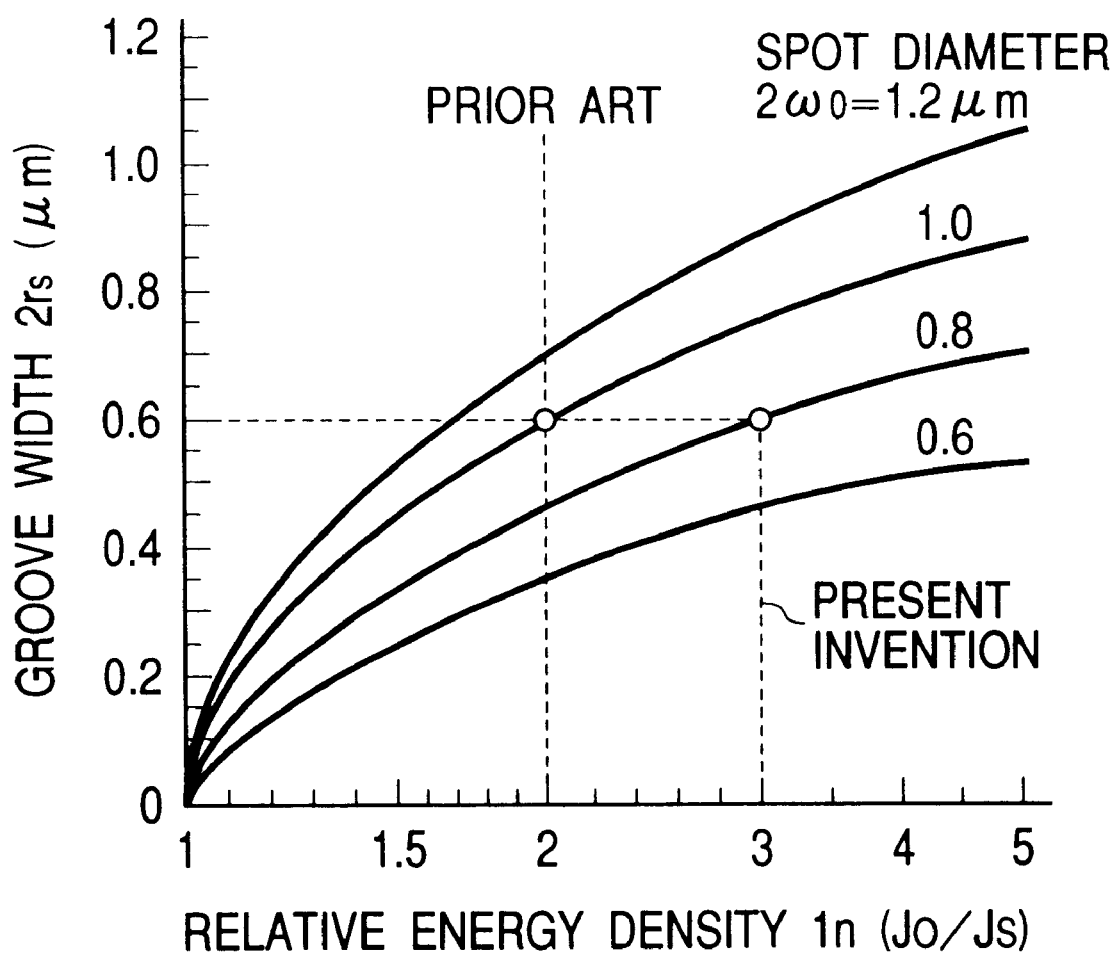
FIG. 12 is a graph showing the relationship between the groove width and the amount of exposure in an resist patterning operation according to the invention.
Figure 13A:
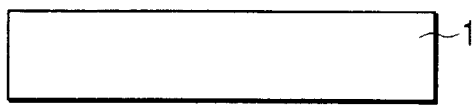
FIGS. 13A, 13B, 13C, 13D, 13E, 13F, 13G and 13H are schematic illustrations of a known method of manufacturing a stamper for forming a land/groove substrate, sequentially showing manufacturing steps.
Figure 13B:
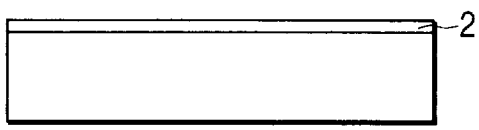
Figure 13C:
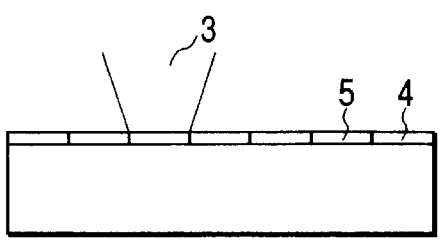
Figure 13D:
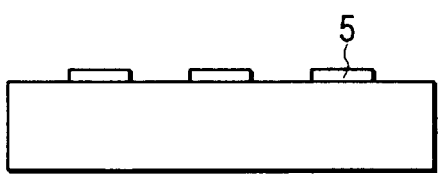
Figure 13E:
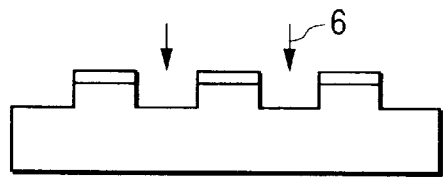
Figure 13F:
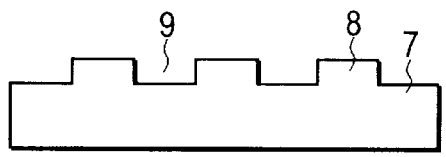
Figure 13G:
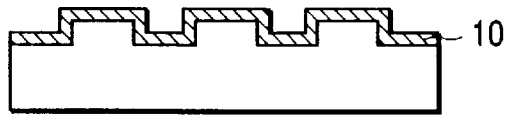
Figure 13H:
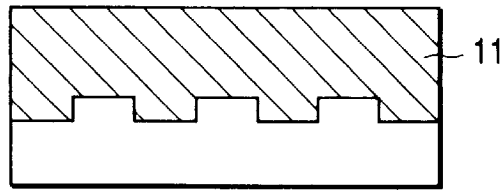
Figure 14A:
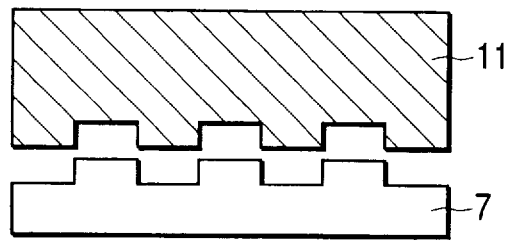
FIGS. 14A and 14B are schematic illustrations of the known method of manufacturing a stamper for forming a land/groove substrate, sequentially showing subsequent manufacturing steps following the step of FIG. 13H.
Figure 14B:
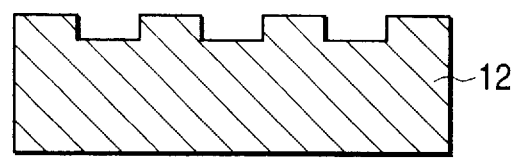
Figure 15:
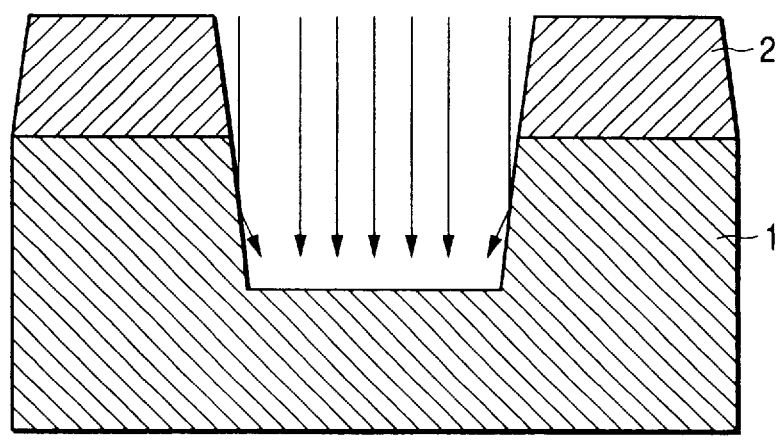
FIG. 15 is another schematic illustration of the prior art, also showing problems thereof.

FIG. 12 shows the relationship between the relative energy density In ($J_0/J_s$) and the resist groove width $2r_s$ (under the same conditions as those described hereinafter by referring to Embodiment 1). With a conventional method, relative energy density In ($J_0/J_s$)=2 is selected. However, for the purpose of the present invention, relative energy density In ($J_0/J_s$)=3 or more is preferably used for exposure. Then, possible variation in the groove width due to fluctuation of the amount of exposure can be minimized to obtain a constant resist groove width, thereby reducing the roughness of the lateral walls produced by anisotropic etching using the photoresist as a mask.

After the exposure for patterning, the thin film layers are subjected to an etching process. The objects of the present invention can be achieved by properly using etching means that provide different etching ratios for the thin film layers made of different materials. For example, when conducting dry etching with $CHF_3$ gas, the $CHF_3$ gas is effective for etching a $SiO_2$ layer but scarcely reacts with an $Al_2O_3$ layer so that it does not practically etch the $Al_2O_3$ layer at all. The etching ratio will be $Al_2O_3:SiO_2$=1:20 to 30. Therefore, if an $SiO_2$ thin film layer is formed on an $Al_2O_3$ thin film layer, the process of etching is automatically terminated, without precisely adjusting the etching time, when the $Al_2O_3$ thin film layer is exposed. In other words, the $Al_2O_3$ thin film layer functions as an etching stopper layer. A predetermined groove depth can be obtained by etching without locational variations regardless of slight fluctuation and/or unevenness in the atmosphere of the etching chamber, if a period of time that is slightly longer than the time calculated on the basis of the etching depth and the etching rate is selected for the etching time.

Figure 16:
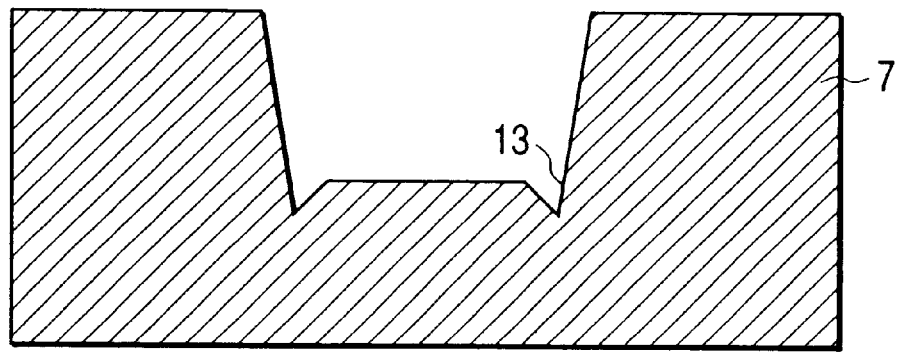
FIG. 16 is still another schematic illustration of the prior art, also showing problems thereof.
Figure 17:
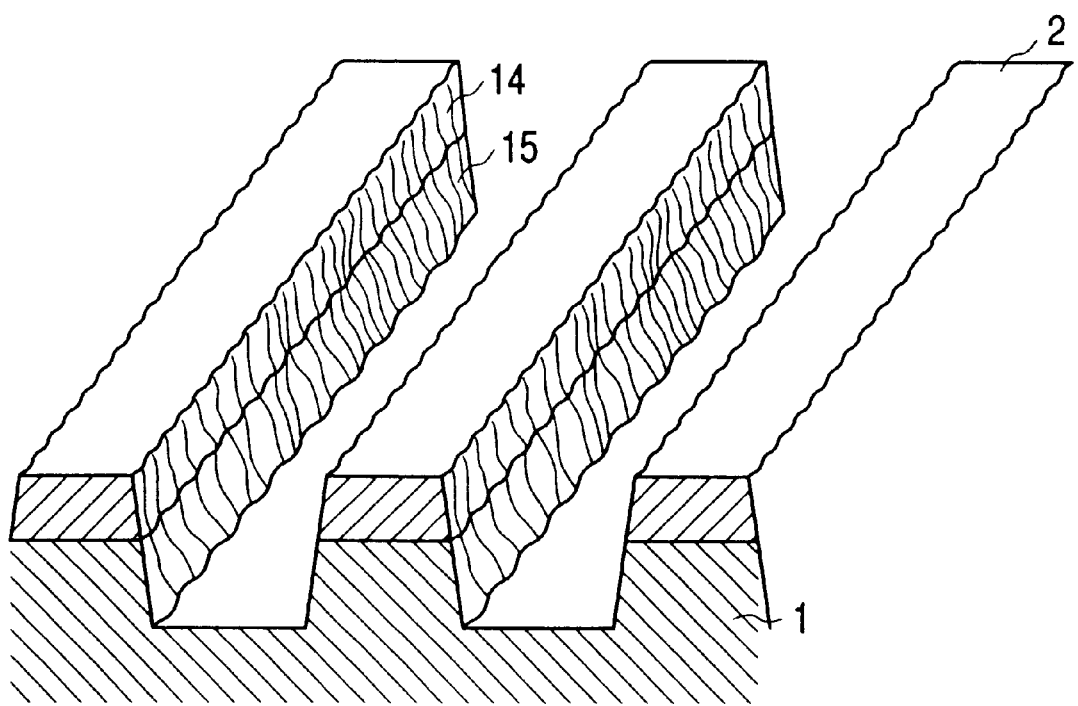
FIG. 17 is still another schematic illustration of the prior art, also showing problems thereof.
Figure 18:
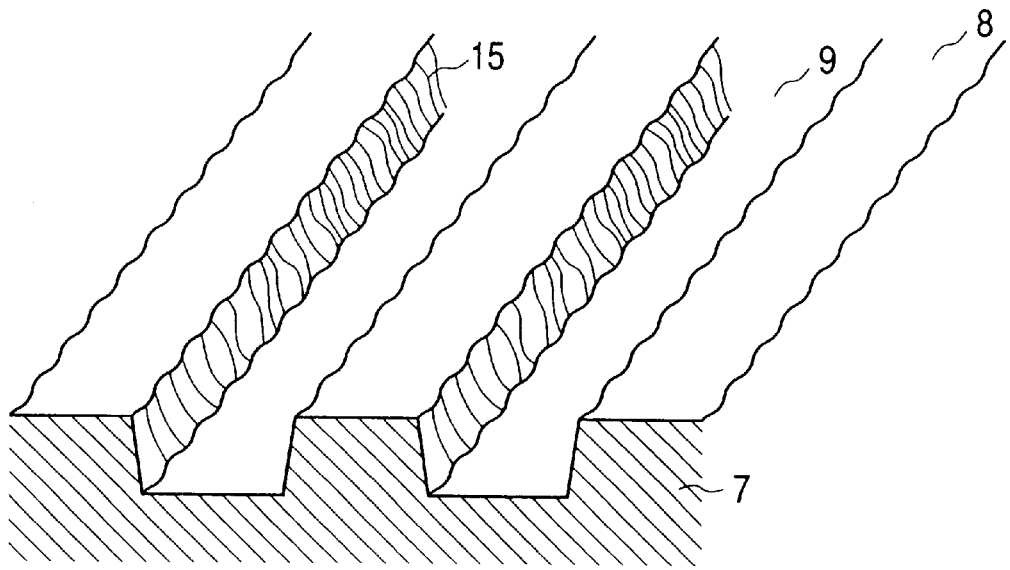
FIG. 18 is still another schematic illustration of the prior art, also showing problems thereof.
Figure 19:
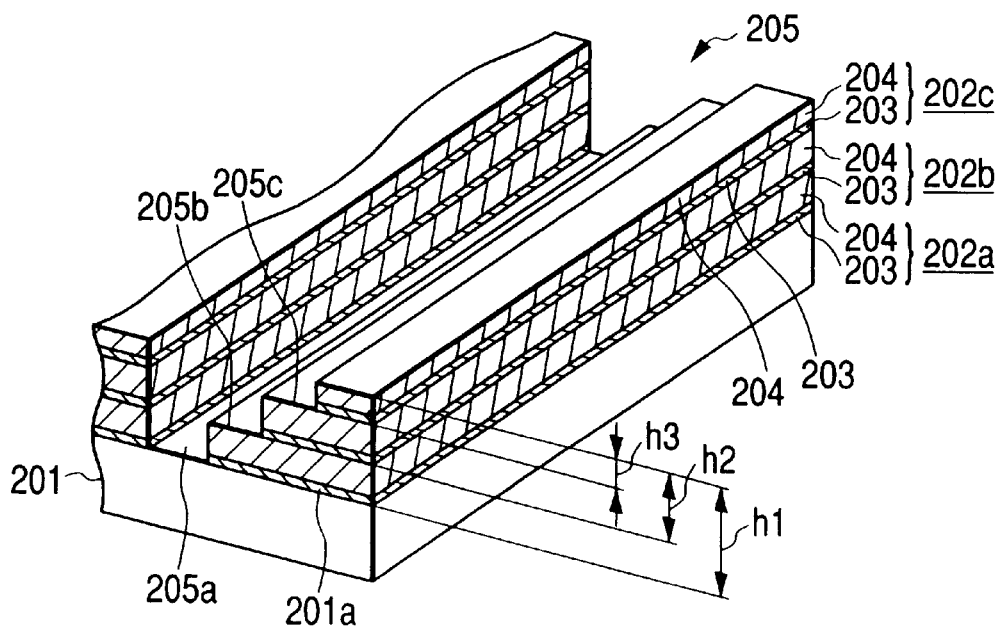
FIG. 19 is a schematic illustration of a known mold for reproducing a diffraction grating.

The prior art is accompanied by the problem that the processed master substrate has excessively etched areas at the lateral ends of the groove (the first problem, see FIG. 16). However, according to the present invention, such problem does not occur because the underlying thin film layer functions as a etching stopper layer. Additionally, while the groove track can become a rough surface as a result of reactive ion etching, this sort of problem does not occur according to the present invention because the surface of the master substrate is covered with a thin film layer (stopper layer) at the groove track position during the reactive ion etching process and the thin film layer can be removed after the reactive ion etching.

If a third thin film layer having a large etching ratio is used as a protection layer, the underlying thin film layer can be etched by using the upper layer a as mask. Then, the film thickness of the resist layer can be further reduced to reduce the surface roughness of each shoulder of the land section, thereby obtaining a constant and smooth groove width.

A high quality optical disk substrate can be prepared by using a stamper according to the invention and copying the land/groove pattern to the surface of the glass substrate typically by means of a photopolymer (2P) method.

A stamper according to the invention is particularly useful for forming an optical disk substrate that is adapted to land/groove recording or forming a deep groove optical disk substrate in which the land stands above the groove by abut 100 nm to 300 nm. The depth of the guiding groove is set to λ/3 n, 2λ/3 n or 5λ/6 n, where λ is the wavelength of the light beam for reproduction from an optical disk and n is the refractive index of the substrate, thereby remarkably reducing cross talks from the adjacent tracks.

A recording medium is prepared by forming an intended recording layer on an optical disk substrate having a land/groove pattern. More specifically, for example, it is possible to manufacture a magneto-optical recording medium comprising at least a sequentially formed first, second and third magnetic layers, where the first magnetic layer is made of perpendicularly magnetized film having a relatively small wall coercivity and a relatively large mobility of domain wall displacement at and near the ambient temperature compared with the third magnetic layer, while the second magnetic layer is a magnetic layer having a Curie temperature lower than that of the first and third magnetic layers and the third magnetic layer is a perpendicularly magnetized film.

U.S. Pat. No. 6,027,825 proposes high density magneto-optical recording using a domain wall displacement detection method. With the domain wall displacement detection method of the above patent document, a reproduction resolution that exceeds the limit defined by the light spot diameter can be obtained in the linear direction by utilizing the mobility of magnetic domain walls that is caused by the temperature gradient of the reading-out light spot. As will be described hereinafter, the domain wall displacement detection method can be particularly effectively applied to a magneto-optical recording medium according to the invention.

Figure 9A:
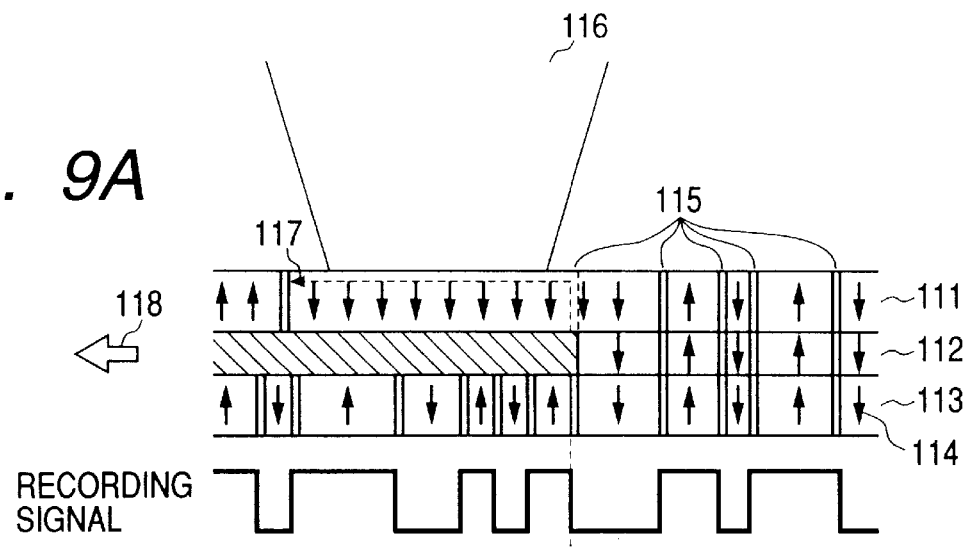
FIGS. 9A, 9B and 9C are schematic illustrations of the domain wall displacement detection method.
Figure 9B:
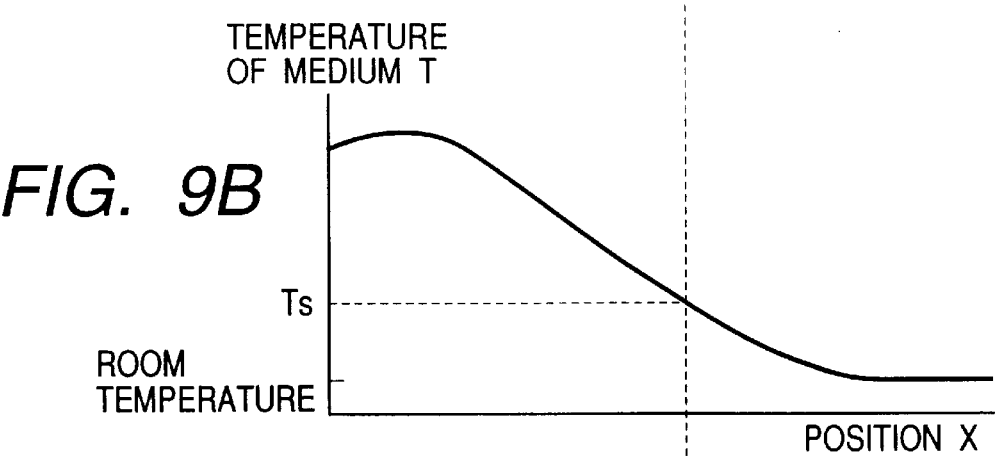
Figure 9C:
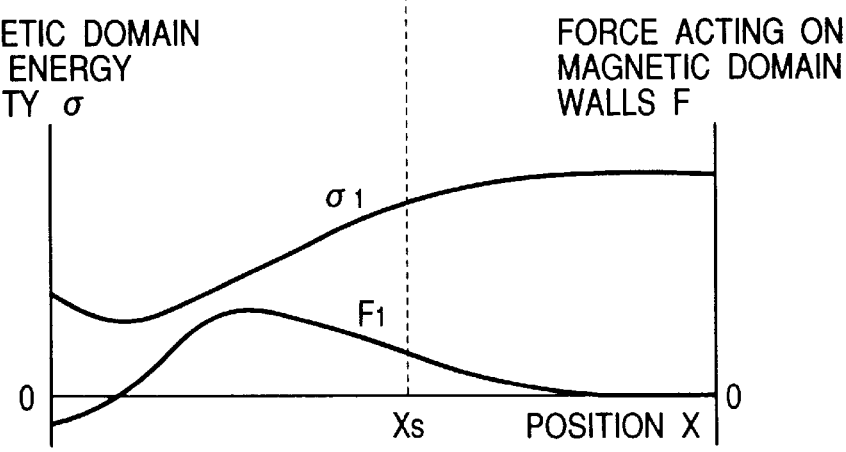

FIGS. 9A through 9C are schematic illustrations of a magneto-optical recording medium using the domain wall displacement detection method and the reproduction method to be used for the recording medium. Of the drawings, FIG. 9A is a schematic cross sectional view of the magneto-optical recording medium. The recording medium comprises a first magnetic layer 111, a second magnetic layer 112, a third magnetic layer that are laid sequentially. Arrows 114 in each of the layers indicate the spinning direction of atoms. Magnetic domain walls 115 are formed along the boundary of regions having opposite spinning directions. In FIG. 9A, reference numeral 116 denotes a reproduction light spot and an arrow 118 indicates the direction along which the recording medium moves with respect to the light spot 116. The graph shown in the lower part of FIG. 9A shows the corresponding recording signal of the recording layer of the recording medium.

FIG. 9B is a graph showing the temperature distribution on the magneto-optical recording medium. This temperature distribution is produced on the recording medium by the light spot 116 with which the recording medium is irradiated for signal reproduction. It will be appreciated that the temperature rises from the beforehand side with respect to the light spot 116 and a temperature peak appears in the afterward side with respect to the light spot 116. The temperature of the recording medium is equal to temperature Ts near the Curie temperature of the second magnetic layer 112 at position Xs.

FIG. 9C is a graph showing the distribution of magnetic domain wall energy density σ1 of the first magnetic layer 111 that corresponds to the temperature distribution of FIG. 9B. As seen, if the magnetic domain wall energy density σ1 has a gradient in the X-direction, force F1=∂σ/∂X is exerted to the magnetic domain wall 115 of each layer located at position X. The force F1 acts to move the magnetic domain walls 115 so as to reduce the magnetic domain wall energy. Since the first magnetic layer 111 has a relatively small anti-magnetic force and a relatively large mobility for magnetic domain walls, the magnetic domain walls 115 will be easily moved by the force F1 by themselves. However, since the temperature of the recording medium is lower than Ts in the beforehand area with respect to the position XS (right side in FIG. 9B) and the first magnetic layer 111 is exchange-coupled with the third magnetic layer 113 having a large wall corecivity for magnetic domain walls through the exchange coupling, the magnetic domain walls 115 in the first magnetic layer 111 are held stationary to the respective positions corresponding to those of the magnetic domain walls 115 in the third magnetic layer 113.

With the domain wall displacement detection method, if the magnetic domain wall 115 is located at position Xs in the recording medium as shown in FIG. 9A, the temperature of the recording medium rises to temperature Ts near the Curie temperature of the second magnetic layer 112 so that exchange coupling between the first magnetic layer 111 and the third magnetic layer is disappeared. As a result, the magnetic domain wall 115 of the first magnetic layer 111 "instantaneously" move to a position where the temperature is higher and the magnetic domain wall energy density is lower as indicated by the broken line arrow 117 in FIG. 9A.

When the magnetic domain wall 115 passes under the reproduction light spot 116, all the spinning directions of atoms of the first magnetic layer 111 within the light spot 116 are oriented in the same direction. Then, every time the magnetic domain wall 115 gets to position Xs as a result of the movement of the recording medium, the magnetic domain wall 115 instantaneously moves under the light spot 116 so that the spinning directions of atoms within the light spot 116 are caused to reverse to orient them in the same direction. Then, consequently, the amplitude of the reproduction signal always becomes a constant maximal value regardless of the gaps separating the magnetic domain walls 115 (the recording mark length), thereby eliminating the problems such as waveform interference due to the optical diffraction limit. The movement of the magnetic domain wall can be detected by using a conventional magneto-optical head as the rotation of the polarization plane of the reproduction laser beam caused by the reversal of the direction of magnetization in the area for the movement of the magnetic domain wall.

Figure 10:
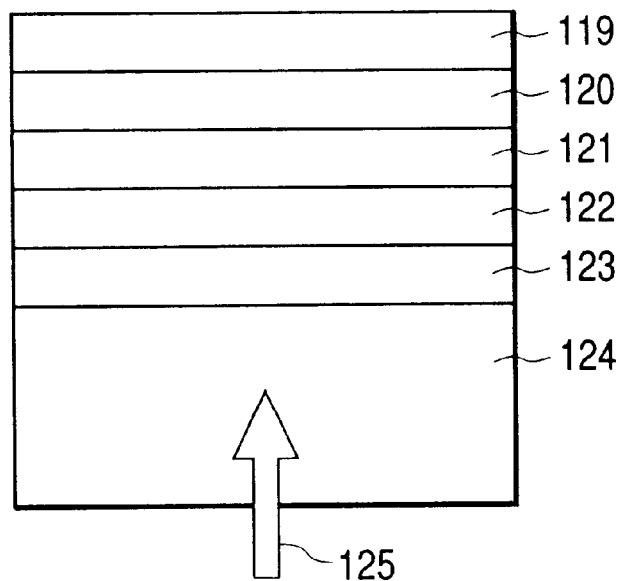
FIG. 10 is a schematic illustration of the configuration of a magneto-optical recording medium to be used for the domain wall displacement detection method.

FIG. 10 is a schematic illustration of the configuration of a magneto-optical recording medium to be used with the domain wall displacement detection method. Referring to FIG. 10, a dielectric layer 123, a first magnetic layer 122, a second magnetic layer 121, a third magnetic layer 120, another dielectric layer 119 are sequentially laid on a transparent substrate (optical disk substrate) 124. In FIG. 10, an arrow 125 shows the direction in which a laser beam for signal recoreding/reproduction enters into the recording medium. The transparent substrate 124 is typically made of polycarbonate while the dielectric layer 123 is typically made of $Si_3N_4$. The $Si_3N_4$ film is formed by DC reactive sputtering to a film thickness of 80 nm by introducing Ar gas to which $N_2$ gas is added. Subsequently, a 30 nm thick GdCo layer, a 10 nm thick DyFe layer and a 40 nm thick TbFeCo layer are sequentially formed for the first magnetic layer 122, the second magnetic layer 121 and the third magnetic layer 120 respectively by applying a DC power to the targets of Gd, Dy, Tb, Fe and Co. These layers can be formed by way of a continuous sputtering process using a magnetron sputtering system. Since the magnetic layers are formed continuously without breaking the vacuum condition, they are exchange coupled with each other. Finally, another $Si_3N_4$ layer is formed for the protection layer 119 to a film thickness of 80 nm.

The composition of each of the magnetic layers is so regulated as to be close to the compensation composition. The Curie temperature of the first magnetic layer is set to 300° C. or more while those of the second magnetic layer and the third magnetic layer are set to 70° C. and 200° C. respectively. The magnetic domains recorded with an interval of 0.1 μm on the track (track pitch=0.85 μm of the magneto-optical recording medium having such configuration can be used for signal reproduction with C/N ratio=40 dB using the domain wall displacement detection method with an ordinary optical head (light spot diameter=1 μm) which emits light with wavelength λ=680 nm and NA=0.55.

As described above, the use of a deep groove substrate having an abrupt tapered section is effective for facilitating the displacement of magnetic domain walls for the purpose of land/groove recording. Particularly, the lateral walls separating the land and the groove that are tapered can be practically free from deposition of a magnetic film, if the magnetic film is formed by using a highly directional film forming method. Then, it is possible to produce magnetic domains whose lateral walls are practically free from magnetic domain walls so that the track can be magnetically segmented to facilitate the domain wall displacement. The mechanical distance between the land track and the groove track is preferably between about 100 nm and about 300 nm, which is at least greater than the total film thickness of the magnetic films (about 80 nm).

Additionally, the lateral walls that are free from deposition of a magnetic film are effective for suppressing thermal interference of the adjacent tracks and improving the resistance against cross erasure of the tracks. Additionally, such lateral walls may give rise to an effect of suppressing cross talks from the adjacent tracks in a reproduction operation in the case of domain wall displacement detection method, because it is possible not to heat the neighboring tracks to temperatures above the domain wall displacement triggering temperature in the reproduction operation. Then, no domain wall displacement occurs in the magnetic domains of the neighboring tracks and the normal magneto-optical reproduction operation proceeds; significant cross talks will not take place if the recording mark length is so chosen as to be smaller than the resolution of the light spot used for the reproduction operation. Then, due to the synergetic effect of the magnetic segmentation of tracks and the improvement in the resistance against cross erasures and the suppression of cross talks, it is possible to dramatically improve the areal recording density by combining a deep groove substrate and the domain wall displacement detection method (see, inter alia, Shiratori: "Realization of a High Density Magneto-optical Disk by Using the Domain Wall Displacement Detection Method", Bulletin of Japan Applied Magnetism, Vol. 23, No. 2, 1999, pp. 764–769).

Figure 11:
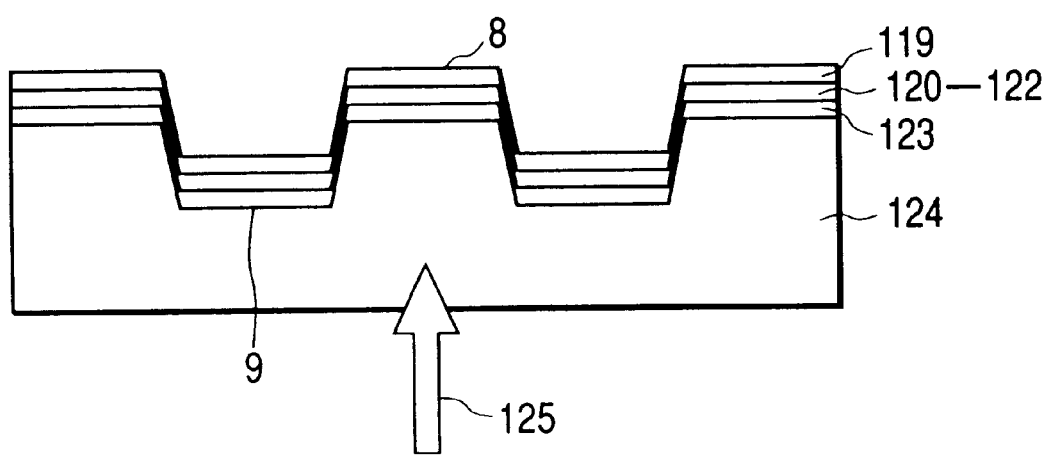
FIG. 11 is a schematic illustration of the configuration of a magneto-optical recording medium to be used for the domain wall displacement detection method, which employs a deep grooved land/groove substrate.

FIG. 11 is a schematic illustration of the configuration of a magneto-optical recording medium to be used with the domain wall displacement detection method. Referring to FIG. 11, the magneto-optical recording medium is prepared by sequentially forming a first magnetic layer 122, a second magnetic layer 121 and a third magnetic layer 120 on a substrate 124. In FIG. 11, the recording track 8 located remotely as viewed from the light beam 125 entering into the recording medium is referred to as a land section, whereas the recording track 9 located closer as viewed from the light beam 125 is referred to as a groove section. In land/groove recording, the groove section operates as a guiding groove for tracking when the land track is used for signal recording/reproduction, whereas the land section operate as a guiding groove for tracking when the groove track is used for signal recording/reproduction. Thus, this recording medium can effectively be used for improving the recording density in the direction perpendicular to track because both the land section and the groove section that are located side by side can be used simultaneously for recording. The domain wall displacement detection method can be conducted advantageously by using a deep groove land/groove substrate having an abrupt tapered section. Additionally, thermally generated cross talks can be reduced if the difference in level between the land section and the groove section is made greater than 100 nm as described in Japanese Patent Application Laid-Open No. 9-161631.

Now, the present invention will be described by way of preferable embodiments by referring to the accompanying drawings that illustrate manufacturing steps thereof.

Embodiment 1

FIGS. 1A through 1H and 2A through 2E are schematic illustrations of a first embodiment of a method of manufacturing a stamper for forming a land/groove substrate according to the invention, sequentially showing manufacturing steps.

Figure 1B:
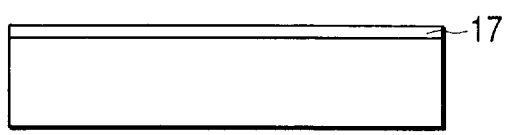
Figure 1C:
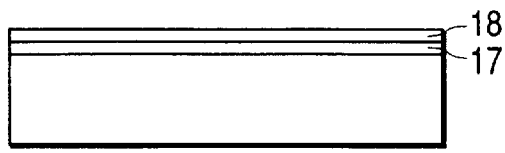

Firstly, a glass master substrate 16 having an outer diameter of 200 mm, a thickness of 6 mm and a surface roughness of less than Ra=0.5 nm is provided and rinsed thoroughly (FIG. 1A). (1) A 20 nm thick $Al_2O_3$ film is evenly formed on the glass master substrate 16 as a first thin film layer 17 by ion beam sputtering under a gas pressure of 0.02 Pa with a film forming rate of 5 nm/min (FIG. 1B). (2) Then, a 140 nm thick $SiO_2$ film is evenly formed on the first thin film layer 17 as a second thin film layer 18 by ion beam sputtering under a gas pressure of 0.02 Pa with a film forming rate of 6 nm/min (FIG. 1C). Both the first thin film layer 17 and the second thin film layer 18 formed by ion beam sputtering are dense films having a good film strength and an improved chemical resistance with an accuracy of ±3% for φ170 mm in terms of film thickness and that of ±2% for φ90 mm in terms of effective disk diameter.

Figure 1D:
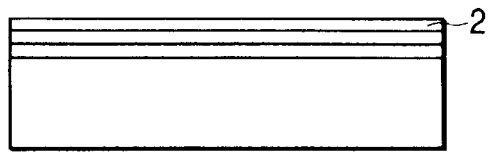
Figure 1E:
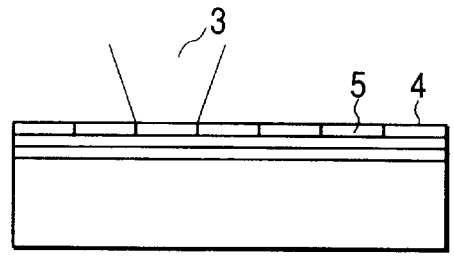
Figure 1F:
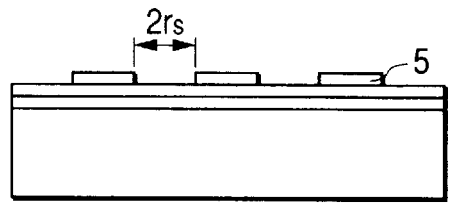
Figure 1G:
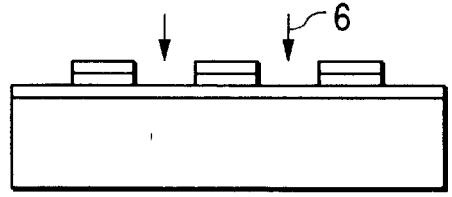

(3) Then, a primer is applied by spin coating to the surface of the glass master substrate 16 after film forming and a positive photoresist 2 (TSMR-V95: tradename, available from Tokyo Ohka Industry) is also applied thereto by spin coating followed by pre-baking in a clean oven. The film thickness of the resist 2 is about 200 nm (FIG. 1D). (4) Thereafter, a predetermined area of the resist 2 is exposed to light with a constant track pitch by using a cutting machine comprising an Ar ion laser with a wavelength of 351 nm as a light source. In FIG. 1D, reference numeral 3 denotes a light beam of the cutting machine and reference numeral 4 denotes the exposed area, whereas reference numeral 5 denotes the unexposed area. Specifically, the track pitch is set to 1.2 µm and the intensity of the laser beam is so selected as to produce a land width (or groove width) of about 0.6 µm after the development process to conduct the exposure process continuously. During the exposure process, the glass master substrate 16 is rotated at a rate of 450 r.p.m. and the laser beam spot diameter $2W_0$ is set to 0.8 µm to produce groove width $2r_s$ of 0.6 µm with $J_0/J_s=3$ (FIG. 1E). (5) Subsequently, a paddle development is conducted using a developing solution (NMD-W: tradename, available from Tokyo Ohka Industry), to remove the exposed area 4. Then, the post-treatment of a pure water shower and spin-drying is conducted followed by post-baking in a clean oven. In this embodiment, the variation in the groove width $2r_s$ can be suppressed to less than ±5% even if the rate of exposure fluctuates by ±10%. On the other hand, the varition in the groove width $2r_s$ is about ±8% for the same fluctuation in the rate of exposure when the laser beam spot diameter $2W_0$ is set to 1 µm with $J_0/J_s=2$ (FIG. 1F). (6) Thereafter, the second thin film layer of an $SiO_2$ layer is anisotropically etched by reactive ion etching (RIE). More specifically, the glass master substrate 16 is placed in the chamber of a reactive ion etching system, and after evacuating the chamber to a degree of vacuum of $1\times10^{-4}$ Pa, it is subjected to a reactive ion etching process by introducing $CHF_3$ gas with a gas flow rate of 6 sccm, a gas pressure of 0.3 Pa, an RF power supply rate of 100W. The etching rate is about 20 nm/min. Since the selective etching ratio of $CHF_3$ gas is $Al_2O_3$: $SiO_2$=1:20 to 30, the thin film layer 17 composed of $Al_2O_3$ functions as a stopper layer against etching. Thus, the predetermined groove depth is constantly obtained to satisfactorily carry out the etching operation (FIG. 1G).

Figure 1H:
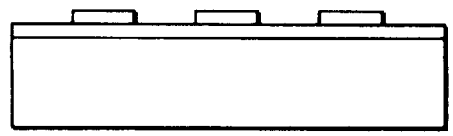
Figure 2A:
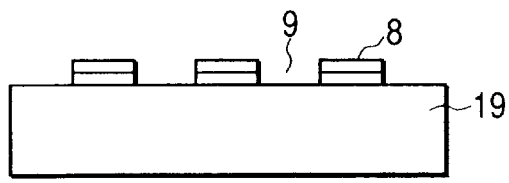
FIGS. 2A, 2B, 2C, 2D and 2E are schematic illustrations of the first embodiment of a method of manufacturing a stamper for forming a land/groove substrate according to the invention, sequentially showing subsequent manufacturing steps following the step of FIG. 1H.

(7) After the anisotropic etching, the glass master substrate 19 is immersed in a remover solution to remove the residual resist (unexposed area 5) (FIG. 1H). (8) Subsequently, the exposed first thin film layer of an $Al_2O_3$ layer is removed by wet etching, using an alkali solution. In FIG. 2A, reference numeral 8 denotes a land and reference numeral 9 denotes a groove. As a result, the part of the surface of the glass master substrate 19 that has not been subjected to reactive ions becomes exposed. As a result of the use of a stopper layer for reactive etching and the subsequent operation of removing the stopper layer, the problem of excessively etched areas and a rough surface of the prior art due to reactive ion etching does not arise in this embodiment. In this embodiment, the surface roughness of the groove is Ra=0.3 nm, which is less than half of the surface roughness of the prior art (FIG. 2A).

Figure 2E:
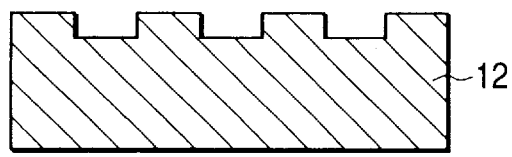
Figure 2B:
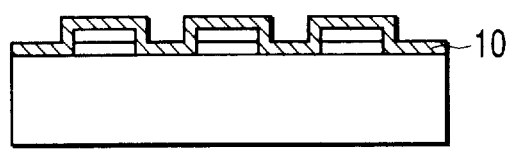
Figure 2C:
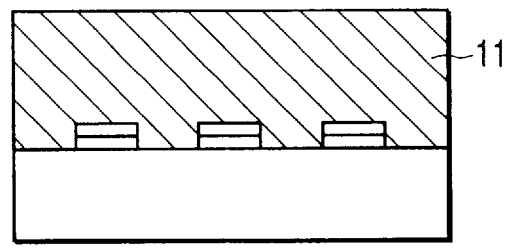
Figure 2D:
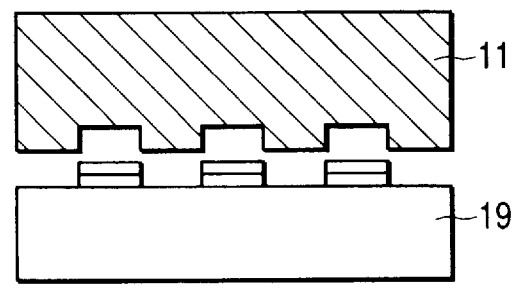

(9) Then, the glass master substrate 19 is rinsed and turned electroconductive by forming an Ni film 10 on the surface with sputtering (FIG. 2B). (10) Additionally, an electro-formed Ni layer 11 is formed on the Ni layer 10 by means of an Ni electroforming process (FIG. 2C). (11) Thereafter, the surface of the electroformed Ni layer is polished to remove the electroformed Ni layer from the glass master substrate 19 (FIG. 2D). (12) As a result, a high precision stamper 12 having an excellent profile is obtained (FIG. 2E).

The advantages of Embodiment 1 will be summarized below. (i) While projections are formed on the edges of the groove with the prior art when the groove has a depth exceeding 100 nm, this problem is successfully solved by additionally using a stopper layer of $Al_2O_3$ in Embodiment 1. (ii) While the surface of the goove 9 becomes rough with the prior art as a result of reactive ion etching, this problem is also solved by removing the $Al_2O_3$ stopper layer after the reactive ion etching process in Embodiment 1. If a magneto-optical recording medium using the domain wall displacement detection method and a deep groove substrate having a groove depth of 160 nm are combined, the magnetic domain walls of the groove section can move smoothly to significantly improve the problem of signal jitter in a signal reproducing operation. (iii) The varition in the amount of exposure of light can be reduced to practically eliminate the prior art problem of wrinkle-like rough surfaces of the lateral walls of the groove by optimizing the conditions of exposure of the photoresist. The signal S/N ratio is improved, and additionally, the problem of wrinkle-like rough surfaces that arises at the shoulders of the land section is alleviated to allow the magnetic domain walls of the groove section to move smoothly and significantly improve the problem of signal jitter in signal reproducing operation, if a magneto-optical recording medium using the domain wall displacement detection method and a deep groove substrate having a groove depth of 160 nm according to the present invention are combined. (iv) Since the groove having a constant depth can easily be processed regardless of any variation in the material of the substrate and fluctuations of the atmosphere in the etching chamber, the variation in the depth of the bottom surface of the groove can be minimized. The land/groove pattern having a constant groove depth of 160 nm±3 nm can be copied to the entire surface of a disk of a glass substrate by using a stamper of Embodiment 1 with a photopolymer (2P) technique. When a magneto-optical recording medium adapted to the domain wall displacement detection method is formed on the substrate and an optical head which emits light with a wavelength of λ=690 nm and NA=0.55 is used for signal reproduction, the optical depth of the groove can be set to λ/3 with the refractive index of the photopolymer being 1.5, so that cross talks from adjacent tracks can be significantly reduced over the entire surface of the recording medium. A similar effect can be obtained if the refractive index of the material of the substrate is n and the mechanical depth of the groove is set to λ/3 n, 2λ/3 n or 5λ/6 n. (v) The costly synthetic quartz substrate required for the prior art can be replaced by a less costly glass substrate.

Embodiment 2

FIGS. 3A through 3H and 4A through 4G are schematic illustrations of a second embodiment of a method of manufacturing a stamper for forming a land/groove substrate according to the invention, sequentially showing manufacturing steps. The common components to those of FIGS. 1A through 2E are denoted respectively by the same reference symbols and will not be described any further if the description is duplicative.

Figure 3A:
FIGS. 3A, 3B, 3C, 3D, 3E, 3F, 3G and 3H are schematic illustrations of a second embodiment of a method of manufacturing a stamper for forming a land/groove substrate according to the invention, sequentially showing manufacturing steps.
Figure 3E:
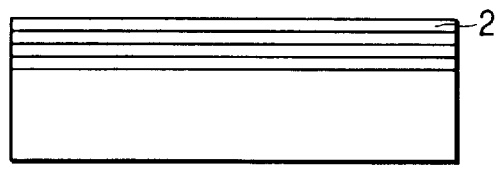
Figure 3B:
Figure 3F:
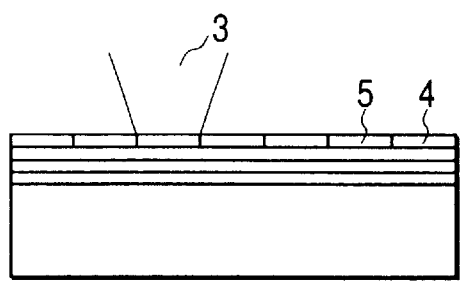
Figure 3C:
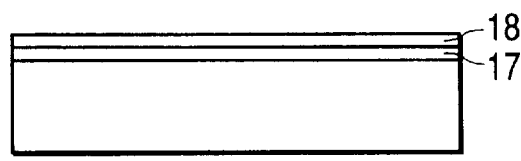
Figure 3G:
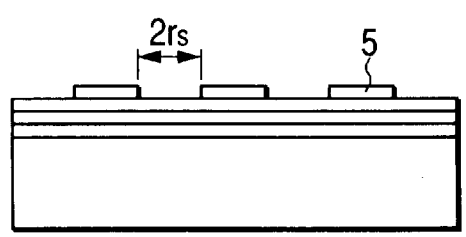
Figure 3D:
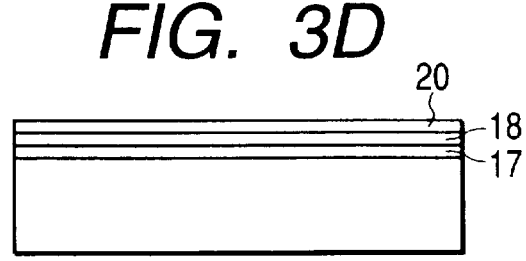
Figure 3H:
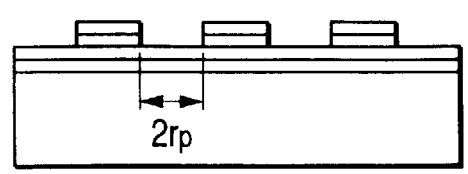

Firstly, a glass master substrate 16 is provided and rinsed thoroughly as in (1) and (2) of Embodiment 1 (FIG. 3A). (1) Then, an $Al_2O_3$ film is formed on the glass master substrate 16 as a first thin film layer 17 (FIG. 3B). (2) Then, an $SiO_2$ film is formed on the first thin film layer 17 as a second thin film layer 18 (FIG. 3C). (3) Another $Al_2O_3$ film is evenly formed on the second thin film layer 18 as a third thin film layer 20, which is a protection layer (FIG. 3D). The film forming conditions were the same as those of the first thin film layer 17, or a gas pressure of 0.02 Pa and a film forming rate of 5 nm/min, to produce a 20 nm thick film layer. (4) Thereafter, a resist 2 is coated thereon as in (3) of Embodiment 1 (FIG. 3E). Note, however, that the third thin film layer 20 of $Al_2O_3$ is formed in Embodiment 2 as a protection layer, the resist layer 2 can have a reduced thickness compared with its counterpart of Embodiment 1. The thickness of the resist layer 2 of Embodiment 2 is set to about 100 nm. (5) Then, the resist 2 is exposed to light with a constant track pitch as in (4) and (5) of Embodiment 1 (FIG. 3F). (6) The resist is subjected to a development process and then a post-baking process for post-treatment. Since a small laser beam spot diameter $2W_0$ (0.8 μm) is used with $J_0/J_s=3$ as in (4) of Embodiment 1, the variation in the groove width $2r_s$ can be suppressed to less than ±5% if the rate of exposure fluctuates by ±10% (FIG. 3G). (7) Subsequently, using a developing solution (NMD-W) the third thin film layer 20 of $Al_2O_3$ is removed by wet etching. Note that, since the developing solution (NMD-W) is alkaline, the third thin film layer 20 of $Al_2O_3$ can be removed by wet etching at the same time of developing the resist 2 ((6) above) if appropriate development conditions are selected. Since the third thin film layer 20 is as thin as about 20 nm, the variation in the width $2r_p$ of the remaining third thin film layer 20 is not remarkably large when compared with the variation in the resist groove width $2r_s$, evenwhere the third thin film layer is isotropically etched. The third thin film layer 20 of $Al_2O_3$ may be subjected to anisotropic etching in place of wet etching in order to alleviate the variation in the width $2r_p$ of the remaining third thin film layer 20 of $Al_2O_3$. If such is the case, the sample is placed in a chamber of a reactive ion etching system, using $CCl_4$ as etching gas. $CCl_4$ gas etches $Al_2O_3$ but practically does not etch $SiO_2$. Therefore, the second thin film layer 18 of $SiO_2$ operates as a stopper layer against etching. As a result, an ideal mask can be formed for the reactive ion etching of the $SiO_2$ layer (FIG. 3H).

(8) After removing the third thin film layer 20 that represents the exposed area, the second thin film layer 18 is subjected to reactive ion etching, using $CHF_3$ gas as in (6) of Embodiment 1. The first thin film layer 17 of $Al_2O_3$ operates as a stopper layer against etching in this embodiment as in Embodiment 1. Additionally, in Embodiment 2, the third thin film layer 20 of $Al_2O_3$ remaining on the second thin film layer 18 in the form of a pattern operates as an etching mask, because it is not etched out by the reactive ion etching. When only the resist 2 is used as an etching mask, it may also be etched and retreat unevenly to give rise to coarse lateral walls. However, such problem does not occur in Embodiment 2.

Figure 4A:
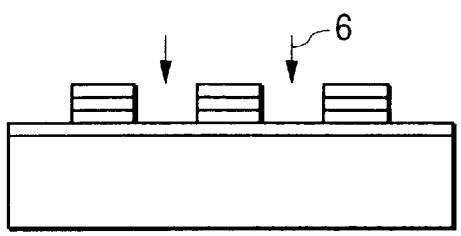
FIGS. 4A, 4B, 4C, 4D, 4E, 4F and 4G are schematic illustrations of the second embodiment of a method of manufacturing a stamper for forming a land/groove substrate according to the invention, sequentially showing subsequent manufacturing steps following the step of FIG. 3H.
Figure 4E:
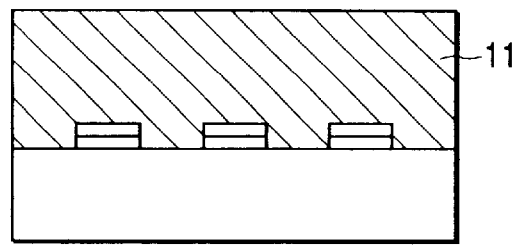
Figure 4B:
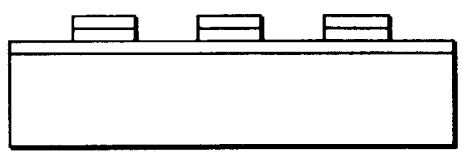
Figure 4F:
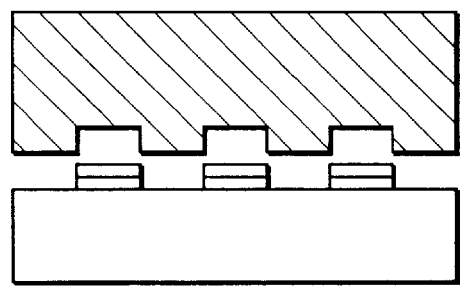
Figure 4C:
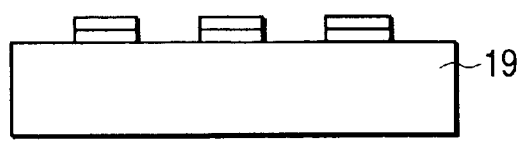

(9) Thereafter, the remaining resist is peeled off as in (7) in Embodiment 1 (FIG. 4B). (10) Subsequently, the third thin film layer 20 of $Al_2O_3$ remaining on the land section and the first thin film layer 17 of $Al_2O_3$ that is exposed in the groove section are removed by wet etching, using an alkali solution. As in Embodiment 1, as a result of the use of a stopper layer for reactive etching and the subsequent operation of peeling off the stopper layer, the problem of excessively etched areas and a coarse surface (particularly of the bottom) of the prior art due to reactive ion etching does not arise in this embodiment. Additionally, since the third thin film layer 20 is formed in Embodiment 2, the problem of wrinkle-like coarse surfaces that arises at the shoulders of the land section as a result of reactive ion etching is alleviated. Furthermore, In this embodiment, the surface roughness of the groove is Ra=0.3 nm or less for both the land section and the groove section (FIG. 4C).

Figure 4G:
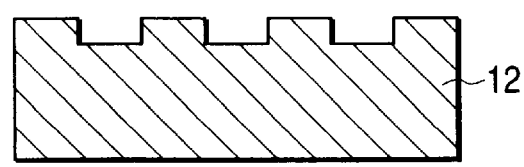
Figure 4D:
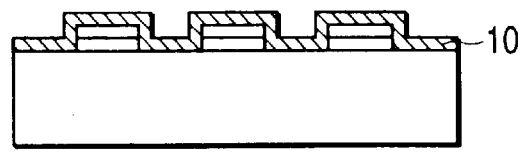

Thereafter, as in (9) through (11) of Embodiment 1. (11) an Ni film 10 is formed on the surface by sputtering (FIG. 4D) and (12) additionally, an electroformed Ni layer 11 is formed on the Ni layer 10 by means of an Ni electroforming process (FIG. 4E). (13) The electroformed Ni layer 11 is then removed from the glass-made master substrate 19 (FIG. 4F). (14) As a result, a high precision stamper 12 having an excellent profile is obtained (FIG. 4G).

Embodiment 2 provides the following advantages in addition to the advantages (i) through (v) of Embodiment 1. (vi) The problem of wrinkle-like rough surfaces that arises at the shoulders of the land section as a result of reactive ion etching is further alleviated by additionally using a third thin film layer of $Al_2O_3$. (vii) The film thickness of the photoresist layer can be reduced to allow the patterning operation with the smooth resist groove having a constant width and further alleviate the wrinkle-like rough surfaces of the lateral walls. The signal S/N ratio is improved, and additionally, the problem of wrinkle-like rough surfaces of about several tens of nm that arises at the shoulders of the land section is alleviated to allow the magnetic domain walls of the groove section to move smoothly and significantly improve the problem of signal jitter in signal reproducing operation, if a magneto-optical recording medium using the domain wall displacement detection method and a deep groove substrate having a groove depth of 160 nm are combined.

Embodiment 3

FIGS. 5A through 5H and 6A through 6H are schematic illustrations of a third embodiment of a method of manufacturing a stamper for forming a land/groove substrate according to the invention, sequentially showing manufacturing steps. The common components to those of FIGS. 1A through 2E are denoted run; respectively by the same reference symbols and will not be described any further if the description is duplicative.

Figure 5A:
FIGS. 5A, 5B, 5C, 5D, 5E, 5F, 5G and 5H are schematic illustrations of a third embodiment of a method of manufacturing a stamper for forming a land/groove substrate according to the invention, sequentially showing manufacturing steps.
Figure 5B:
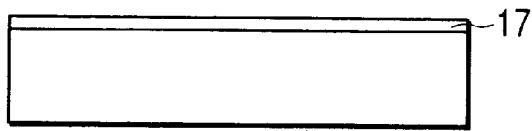
Figure 5C:
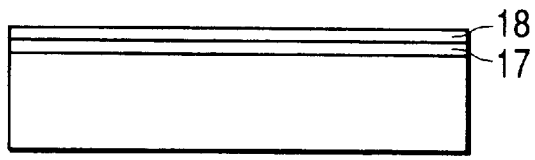
Figure 5D:
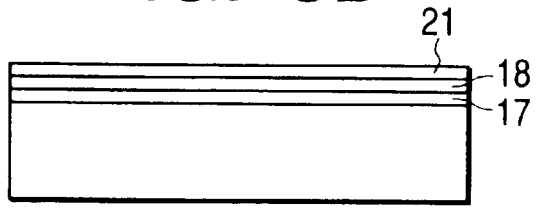
Figure 5E:
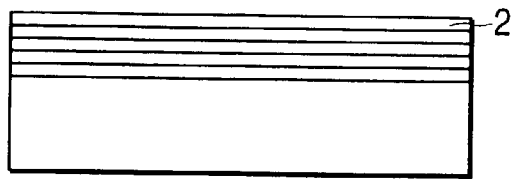

Firstly, a glass master substrate 16 is provided and rinsed thoroughly as in (1) and (2) of Embodiment 1 (FIG. 5A). (1) Then, an $Al_2O_3$ film is formed on the glass master substrate 16 as a first thin film layer 17 (FIG. 5B). (2) Then, an $SiO_2$ film is formed on the first thin film layer 17 as a second thin film layer 18 (FIG. 5C). (3) Subsequently, a Cr film is evenly formed on the second thin film layer 18 as a third thin film layer 21, which is a protection layer. The film is formed by ion beam sputtering under conditions of gas pressure of 0.02 Pa and film a forming rate of 5 nm/min, to produce a 20 nm thick film layer (FIG. 5D). (4) Thereafter, a resist 2 is coated as in (3) of Embodiment 1 (FIG. 3E). Note, however, that the third thin film layer 20 of Cr is formed in Embodiment 3 as a protection layer, the resist layer 2 can have a reduced thickness compared with its counterparts of Embodiments 1 and 2. The thickness of resist layer 2 of Embodiment 3 is set to about 70 nm. When using the third thin film layer 21 of Cr as a mask for reactive ion etching, a large selective etching ratio can be taken to further reduce the rough surfaces of the lateral walls compared with the use of a third thin film layer 20 of $Al_2O_3$ (Embodiment 2). The selective etching ratio is Cr $SiO_2$=1:50 to 100. Cr has an excellent adhesion effect and the Cr film can hardly be peeled off (FIG. 5E).

Figure 5F:
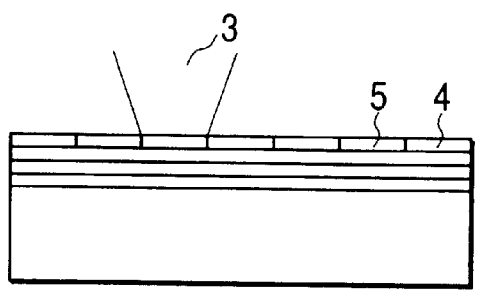
Figure 5G:
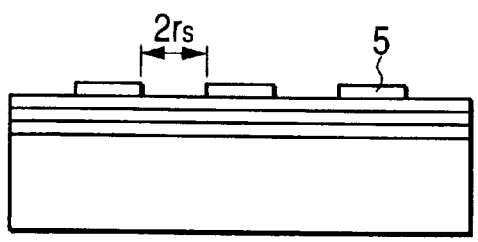

(5) Then, the resist 2 is exposed to light with a constant track pitch as in (4) and (5) of Embodiment 1 (FIG. 5F). (6) The resist is subjected to a development process and then a post-baking process for post-treatment. Since a small laser beam spot diameter (0.8 μm) is used with $J_0/J_s=3$ for exposure as in (4) of Embodiment 1, the variation in the groove width $2r_s$ can be suppressed to less than ±5% even if the rate of exposure fluctuates by ±10% (FIG. 5G).

Figure 5H:
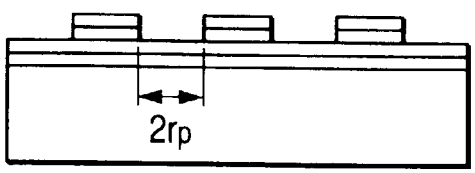

(7) Subsequently, the third thin film layer 21 of Cr is removed by wet etching, using a cerium ammonium nitride solution. Note that, since the third thin film layer 21 is as thin as about 20 nm, it can be removed satisfactorily by isotropic wet etching as in Embodiment 2. It is also possible to remove the third thin film layer 21 by anisotropic etching using $CCl_4$ as etching gas. $CCl_4$ gas etches the Cr layer but practically does not react with the $SiO_2$ layer to scarcely etch it (FIG. 5H).

Figure 6A:
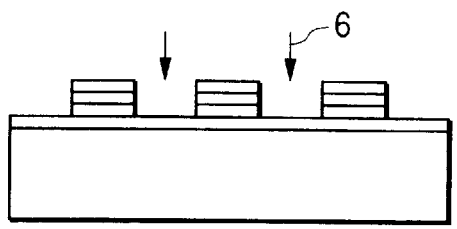
FIGS. 6A, 6B, 6C, 6D, 6E, 6F, 6G and 6H are schematic illustrations of the third embodiment of method of manufacturing a stamper for forming a land/groove substrate according to the invention, sequentially showing subsequent manufacturing steps following the step of FIG. 5H.
Figure 6E:
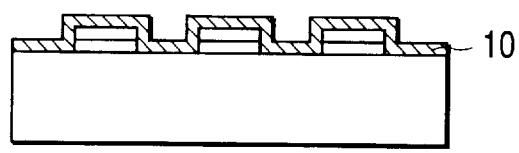
Figure 6B:
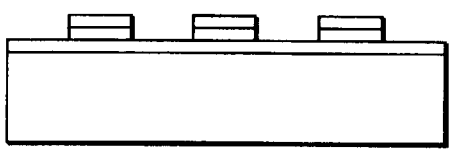
Figure 6F:
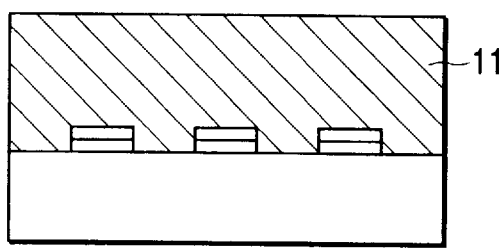
Figure 6C:
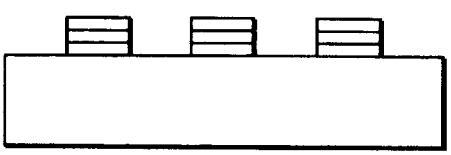
Figure 6G:
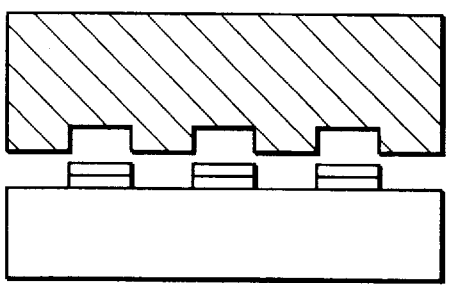
Figure 6D:
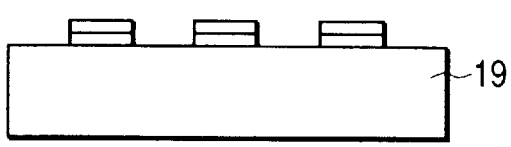

(8) After removing the third thin film layer 21 that represents the exposed area, the second thin film layer 18 is subjected to reactive ion etching, using $CHF_3$ gas as in (6) of Embodiment 1. The first thin film layer 17 of $Al_2O_3$ operates as a stopper layer against etching in this embodiment as in Embodiment 1. Additionally, as in Embodiment 2, the third thin film layer 21 operates as an etching mask to enhance the etching effect (FIG. 6A). (9) Thereafter, the remaining resist is removed as in (7) and (8) in Embodiment 1 (FIG. 6B). (10) Subsequently, the first thin film layer 17 is removed by using an alkali solution. (11) Subsequently, the third thin film layer 21 of Cr exposed to the surface of the land section 8 is removed by wet etching, using a cerium ammonium nitride solution (FIG. 6D).

Figure 6H:
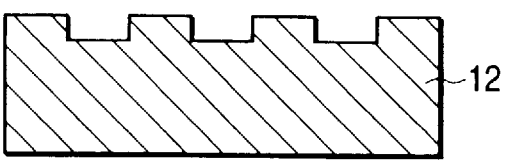

Thereafter, as in (9) through (10) of Embodiment 1. (12) an Ni film 10 is formed on the surface by sputtering (FIG. 6E) and (13) additionally, an electroformed Ni layer 11 is formed on the Ni layer 10 by means of an Ni electroforming process (FIG. 6F). (14) The electroformed Ni layer 11 is then removed (FIG. 6G). (15) As a result, a high precision stamper 12 having an excellent profile is obtained (FIG. 6H).

Embodiment 3 provides the remarkable advantages achieved by using Cr (particularly in terms of (vi) and (vii) above) in addition to the advantages (i) through (vii) of Embodiments 1 and 2.

Embodiment 4

FIGS. 7A through 7H and 8A through 8C are schematic illustrations of a fourth embodiment of a method of manufacturing a stamper for forming a land/groove substrate according to the invention, sequentially showing manufacturing steps. The common components to those of FIGS. 1A through 1H and FIGS. 2A through 2E are denoted respectively by the same reference symbols and will not be described any further if the description is duplicative.

Figure 7A:
FIGS. 7A, 7B, 7C, 7D, 7E, 7F, 7G and 7H are schematic illustrations of a fourth embodiment of a method of manufacturing a stamper for forming a land/groove substrate according to the invention, sequentially showing manufacturing steps.
Figure 7E:
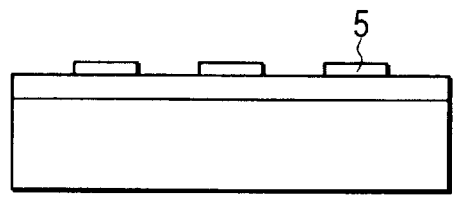
Figure 7B:
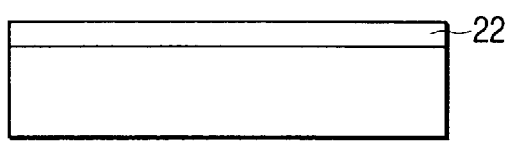

Firstly, a single crystal Si substrate 21 having an outer diameter of 200 mm, a thickness of 0.7 mm and a surface roughness of less than Ra=0.5 nm is provided and rinsed thoroughly (FIG. 7A). Single crystal Si substrates are popularly used in semiconductor manufacturing processes and hence commercially available at prices lower than synthetic quartz substrates. (1) A thermally oxidated film ($SiO_2$) 22 is uniformly formed on the Si substrate 21 (FIG. 7B). The film thickness is so chosen as to be substantially equal to the groove depth, which is 160 nm. The thermally oxidated film 22 can be easily and uniformly formed on the substrate to achieve a film thickness accuracy of ±1%. Additionally, the thermal oxide film 22 adheres firmly to the Si substrate 21 and is very dense. Since the polished surface of the land section can be used without any further treatment, the surface roughness can be most minimized in this embodiment compared with the preceding embodiments. After forming the thermally oxidted film 22, if necessary, a glass substrate may be bonded thereto to be adapted to the subsequent steps. Then, (2) a resist 2 is coated thereto (FIG. 7C), (3) exposed to light (FIG. 7D) and (4) developed (FIG. 7E).

Figure 7F:
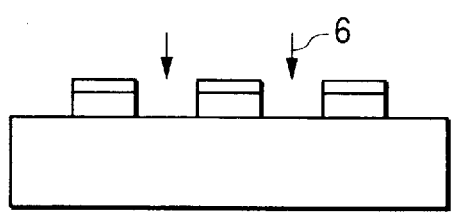
Figure 7C:
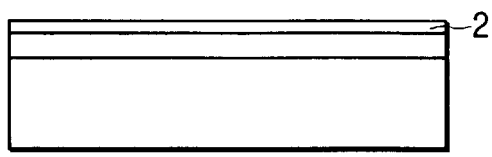
Figure 7G:
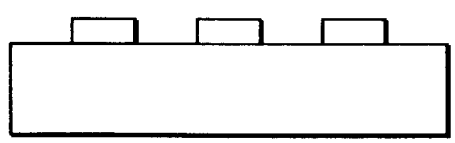
Figure 7D:
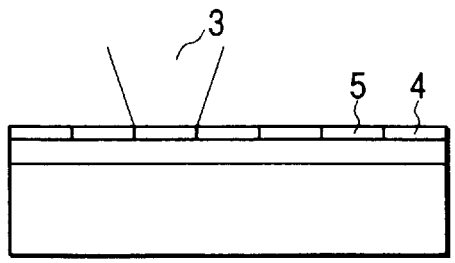
Figure 7H:
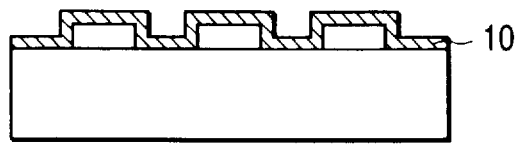
Figure 8A:
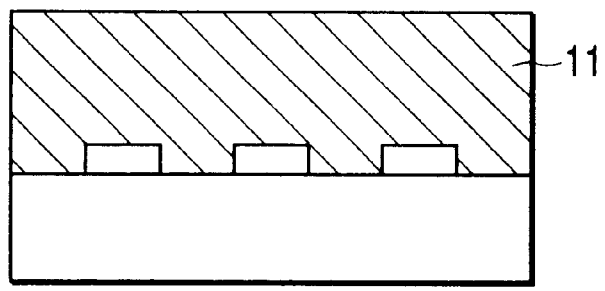
FIGS. 8A, 8B and 8C are schematic illustrations of the fourth embodiment of a method of manufacturing a stamper for forming a land/groove substrate according to the invention, sequentially showing subsequent manufacturing steps following the step of FIG. 7H.
Figure 8B:
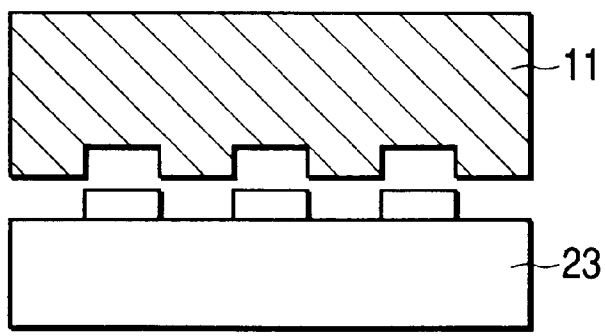
Figure 8C:
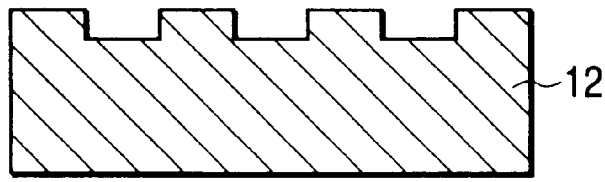

(5) Thereafter, as in the etching of the second thin film layer in (6) of Embodiment 1, the thermally oxidated film ($SiO_2$) 22 is subjected to reactive ion etching (RIE). More specifically, the master substrate is placed in the chamber of a reactive ion etching system, and after evacuating the chamber to a degree of vacuum of $1 \times 10^{-4}$ Pa, it is subjected to a reactive ion etching process by introducing $CHF_3$ gas with a gas flow rate of 6 sccm, a gas pressure of 0.3 Pa, an RF power supply rate of 100W. $CHF_3$ gas etches an $SiO_2$ layer but it scarcely reacts with an Si substrate to hardly etch it (the selective etching ratio is Si : $SiO_2$=1:20 to 30). Therefore, the etching process is automatically terminated at the time the Si substrate is exposed without adjusting the etching time. A predetermined groove depth can be obtained by etching without locational variation regardless of slight fluctuations and/or unevenness in the atmosphere of the etching chamber, if a period of time that is longer by about 5% than that calculated on the basis of the etching depth and the etching rate is selected for the etching time (FIG. 7F). However, care should be taken not to conduct excess etching because C (carbon) can adhere onto the groove to such an extent that it is impossible to remove it. Thereafter, as in (7) through (10) of Embodiment 1, (6) the remaining resist is removed (FIG. 7G) and (7) subsequently an Ni film 10 is formed on the surface by sputtering (FIG. 7H). Then, (8) additionally, an electroformed Ni layer 11 is formed on the Ni layer 10 by means of an Ni electroforming process (FIG. 8A) and then (9) the electroformed Ni layer 11 is peeled off (FIG. 8B). (10) As a result, a high precision stamper 12 having an excellent profile is obtained (FIG. 8C).

In addition to the advantages (i) through (iii) and (v) of Embodiment 1, Embodiment 4 provides advantages including that the accuracy of the groove depth of (iv) can be further improved. Additionally, (viii) the surface roughness of the land section is further reduced to less than Ra=0.2 nm to improve the signal S/N, (ix) the films are less apt to be peeled off to make it possible to reliably manufacture land/groove stampers and (x) a simpler manufacturing process can be used for achieving the same effects.

Thus, the present invention provides the following improvements to the above described known method of preparing a stamper for the manufacture of land/groove substrates. Additionally, it is possible to dramatically improve the areal recording density by combining a deep groove substrate of a groove depth of 160 nm according to the invention and the domain wall displacement detection method, compared with a magneto-optical recording medium of the prior art. (a) While the prior art is accompanied by the problem that projections appear on the edges of the groove when the groove depth exceeds 100 nm, this problem is successfully solved by the additional use of a stopper layer according to the invention. (b) While the prior art is accompanied by the problem that the surface of the groove track is made rough as a result of the reactive ion etching process, this problem is solved by removing the stopper layer after the reactive ion etching process according to the invention. (c) The wrinkle-like rough surfaces of the lateral walls can be dramatically reduced by optimizing the conditions of exposing photoresist to light. Additionally, the rough surfaces of the shoulder section that appear as a result of the reactive ion etching process can be reduced by the additional use of a protection layer. Still additionally, a constant groove width and a smooth patterning operation can be ensured by reducing the thickness of the resist layer to further reduce the wrinkle-like coarse surfaces of the lateral walls. (d) When a magneto-optical recording medium using the domain wall displacement detection method and a deep groove substrate according to the invention are combined, the surface roughness of both the land section and the groove section can be reduced to improve the S/N of the reproduction signal. Additionally, as a result of the improvement of the wrinkle-like coarse surfaces of the land section, the shoulder section and the lateral walls, the projections that otherwise appear on the groove edges are eliminated to allow magnetic domain walls to move smoothly in both the land section and the groove section and improve the signal jitters that can appear when reproducing a signal. (e) Since the groove having a constant depth can easily be processed regardless of any variation in the material of the substrate and fluctuations of the atmosphere in the etching chamber, the variation in the depth of the bottom surface of the groove can be minimized. The land/groove pattern having a constant groove depth of 160 nm ±3 nm can be copied to the entire surface of a disk of a glass substrate by using a stamper according to the present invention with a photopolymer (2P) technique. When a magneto-optical recording medium adapted to the domain wall displacement detection method is formed on the substrate and an optical head which emits light with a wavelength of $\lambda=690$ nm and NA=0.55 is used, the optical depth of the groove can be set to $\lambda/3$, if the refractive index of the photopolymer is 1.5, so that cross talks from adjacent tracks can be significantly reduced over the entire surface of the recording medium. A similar effect can be obtained if the refractive index of the material of the substrate is n and the mechanical depth of the groove is set to $\lambda/3\,n$, $2\lambda/3\,n$ or $5\lambda/6\,n$. (f) The costly synthetic quartz substrate required for the prior art can be replaced by a less costly glass substrate.

What is claimed is:

1. A method of manufacturing a stamper for forming an optical disk substrate by applying a photoresist onto a master substrate, exposing the photoresist to light to produce a pattern by using a laser beam, and forming a guiding groove by etching using the remaining photoresist after development as a mask comprising the steps of:

forming in advance at least a first thin film layer and a second thin film layer of mutually different materials sequentially on said master substrate in a multi-layer structure, wherein said second thin film layer is thicker than said first thin film layer;

dry-etching said second thin film layer selectively and anisotropically until reaching said first thin film layer using the remaining photoresist as a mask; and wet-etching said first thin film layer selectively for removal thereof after the anisotropic etching to produce said guiding groove.

2. A stamper manufactured by the manufacturing method according to claim 1.

3. The stamper according to claim 2, wherein said stamper is able to form a necessary substrate for a domain wall displacement magneto-optical recording medium.

4. The method according to claim 1, wherein a depth of said guiding groove is between 100 nm and 300 nm.

5. The method according to claim 1, wherein a depth of said guiding groove is $\lambda/3n$, $2\lambda/3n$ or $5\lambda/6n$, where $\lambda$ is the wavelength of a light beam for reproduction with an optical disk and n is the refractive index of the optical disk substrate.

6. The method according to claim 1, wherein said forming step is conducted by ion beam sputtering, vacuum evaporation, sputtering, ion plating, ion beam assisted evaporation or ionized metal sputtering.

7. The method according to claim 1, wherein said anisotropic etching is reactive ion etching (RIE), sputtering etching (SE), reactive ion beam etching (RIBE) or sputtering ion beam etching (SIBE).

8. The method according to claim 1, wherein said first thin film layer is composed of $Al_2O_3$ or $Cr_2O_3$ and said second thin film layer is composed of $SiO_2$.

9. The method according to claim 8, wherein $CHF_3$ gas or a mixture gas of $CF_4$ and $H_2$ is used for etching the second thin film layer of $SiO_2$.

10. The method according to claim 8, wherein the first thin film layer of $Al_2O_3$ or $Cr_2O_3$ is etched by wet etching using an alkali solution.

11. The method according to claim 1, wherein a relative energy density $(J_0/J_s)$ of 3 or more is used for the exposure process, using the following formula for determining the groove width $2r_s$ of the remaining photoresist after development in the case of conducting the exposure process with a relative energy density $(J_0/J_s)$:

$$2r_s = \sqrt{2}w_0 \cdot \sqrt{\{\ln(J_0/J_s)\}},$$

where a contour of a laser beam spot J (r) is approximated by a Gaussian distribution using the following formula:

$$J(r) = J_0 \exp(-2r^2/w_0^2),$$

where r is a distance from a center of the laser beam and $w_0$ is spot radius ($1/e^2$ diameter), $J_s$ being an amount of exposure (irradiated energy density) at which an amount of etching after development is approximately equivalent to a thickness of the photoresist.

12. A method of manufacturing a stamper for forming an optical disk substrate by applying a photoresist onto a master substrate, exposing the photoresist to light to produce a pattern by using a laser beam, and forming a guiding groove by etching using the remaining photoresist after development as a mask comprising the steps of:

forming in advance at least a first thin film layer, a second thin film layer and a third thin film layer of mutually different materials sequentially on said master substrate in a multi-layer structure, wherein said second thin film layer is thicker than said first and third thin film layers;

etching said third thin film layer selectively by using the remaining photoresist as a mask;

dry-etching said second thin film layer selectively and anisotropically after the etching step until reaching said first thin film layer using the said third thin film layer as a mask; and wet-etching said first thin film layer selectively for removal thereof after the anisotropic etching to produce said guiding groove.

13. The method according to claim 12, wherein said third thin film layer is etched by anisotropic etching.

14. The method according to claim 12, wherein said third thin film layer is etched by wet etching.

15. The method according to claim 12, wherein said first thin film layer is composed of $Al_2O_3$ or $Cr_2O_3$, said second thin film layer is composed of $SiO_2$, and said third thin film layer is composed of $Al_2O_3$ or $Cr_2O_3$.

16. The method according to claim 15, wherein $CCl_4$ gas is used for etching the third thin film layer of $Al_2O_3$ or $Cr_2O_3$.

17. The method according to claim 15, wherein the third thin film layer of $Al_2O_3$ or $Cr_2O_3$ is etched by wet etching using an alkali solution.

18. The method according to claim 15, wherein $CHF_3$ gas or a mixture gas of $CF_4$ and $H_2$ is used for etching the second thin film layer of $SiO_2$.

19. The method according to claim 15, wherein the first thin film layer of $Al_2O_3$ or $Cr_2O_3$ is etched by wet etching using an alkali solution.

20. The method according to claim 12, wherein said first thin film layer is composed of $Al_2O_3$ or $Cr_2O_3$, said second thin film layer is composed of $SiO_2$, and said third thin film layer is composed of Cr.

21. The method according to claim 20, wherein the third thin film layer of Cr is etched by wet etching using a cerium ammonium nitride solution.

22. The method according to claim 20, wherein $CHF_3$ gas or a mixture gas of $CF_4$ and $H_2$ is used for etching the second thin film layer of $SiO_2$.

23. The method according to claim 20, wherein $CCl_4$ gas is used for etching the third thin film layer of Cr.

24. The method according to claim 20, wherein the first thin film layer of $Al_2O_3$ or $Cr_2O_3$ is etched by wet etching using an alkali solution.

25. The method according to claim 12, wherein a depth of said guiding groove is between 100 nm and 300 nm.

26. The method according to claim 12, wherein a depth of said guiding groove is $\lambda/3n$, $2\lambda/3n$ or $5\lambda/6n$, where $\lambda$ is the wavelength of a light beam for reproduction with an optical disk and n is the refractive index of the optical disk substrate.

27. The method according to claim 12, wherein said forming step is conducted by ion beam sputtering, vacuum evaporation, sputtering, ion plating, ion beam assisted evaporation or ionized metal sputtering.

28. The method according to claim 12, wherein said anisotropic etching is reactive ion etching (RIE), sputtering etching (SE), reactive ion beam etching (RIBE) or sputtering ion beam etching (SIBE).

29. A stamper manufactured by the manufacturing method according to claim 12.

30. The stamper according to claim 29, wherein said stamper is able to form a necessary substrate for a domain wall displacement magneto-optical recording medium.

* * * * *

UNITED STATES PATENT AND TRADEMARK OFFICE
CERTIFICATE OF CORRECTION

PATENT NO. : 6,653,057 B1
DATED : November 25, 2003
INVENTOR(S) : Osamu Koyama

It is certified that error appears in the above-identified patent and that said Letters Patent is hereby corrected as shown below:

Column 1,
Line 26, "operate" should read -- operates --.

Column 4,
Line 9, "Ad due" should read -- due --.

Column 6,
Line 27, "an resist" should read -- a resist --.

Column 7,
Line 36, "Rial" should read -- Rials --.

Column 9,
Line 16, "a as mask." should read -- as a mask. --;
Line 27, "abut" should read -- about --;
Line 65, ", a" should read -- , and a --; and
Line 66, "layer that" should read -- layer 113, which --.

Column 10,
Line 36, "corecivity" should read -- coercivity --; and
Line 49, "move" should read -- moves --.

Column 11,
Line 13, "recoreding/reproduction" should read -- recording/reproduction --;
Line 36, "= 0.85 $\mu$m" should read -- = 0.85$\mu$m) --; and
Line 40, "diameter = 1" should read -- diameter $\cong$ 1 --.

Column 12,
Line 28, "operate" should read -- operates --.

Column 15,
Line 49, "retreat" should read -- retreated --.

UNITED STATES PATENT AND TRADEMARK OFFICE
CERTIFICATE OF CORRECTION

PATENT NO.   : 6,653,057 B1
DATED        : November 25, 2003
INVENTOR(S)  : Osamu Koyama It is certified that error appears in the above-identified patent and that said Letters Patent is hereby corrected as shown below:

Column 16,
Line 36, "run;" should be deleted.

Column 17,
Line 67, "oxidted" should read -- oxidated --.

Signed and Sealed this

Eleventh Day of May, 2004

JON W. DUDAS
*Acting Director of the United States Patent and Trademark Office*